US009625193B2

(12) United States Patent
Yokoyama et al.

(10) Patent No.: US 9,625,193 B2
(45) Date of Patent: Apr. 18, 2017

(54) EJECTOR

(71) Applicant: DENSO CORPORATION, Kariya, Aichi-pref. (JP)

(72) Inventors: Yoshiyuki Yokoyama, Obu (JP); Haruyuki Nishijima, Obu (JP); Etsuhisa Yamada, Kariya (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 123 days.

(21) Appl. No.: 14/655,746

(22) PCT Filed: Dec. 23, 2013

(86) PCT No.: PCT/JP2013/007526
§ 371 (c)(1),
(2) Date: Jun. 26, 2015

(87) PCT Pub. No.: WO2014/103277
PCT Pub. Date: Mar. 7, 2014

(65) Prior Publication Data
US 2015/0345841 A1    Dec. 3, 2015

(30) Foreign Application Priority Data

Dec. 27, 2012  (JP) ................................. 2012-285646
Nov. 11, 2013  (JP) ................................. 2013-233018

(51) Int. Cl.
*F25B 41/00* (2006.01)
*F04F 5/46* (2006.01)
(Continued)

(52) U.S. Cl.
CPC ............... *F25B 41/00* (2013.01); *F04F 5/46* (2013.01); *F25B 5/02* (2013.01); *F25B 41/062* (2013.01);
(Continued)

(58) Field of Classification Search
CPC ........ F25B 2341/001; F25B 2341/0011; F25B 9/08; F25B 2341/0016; F25B 41/062; F04F 5/20
See application file for complete search history.

(56) References Cited

U.S. PATENT DOCUMENTS

| 4,378,681 A | 4/1983 | Modisette |
| 2001/0025499 A1 | 10/2001 | Takeuchi et al. |

(Continued)

FOREIGN PATENT DOCUMENTS

| JP | S43002670 B1 | 10/1968 |
| JP | S61076800 A | 4/1986 |

(Continued)

OTHER PUBLICATIONS

U.S. Appl. No. 14/655,745, filed Jun. 26, 2015.
(Continued)

*Primary Examiner* — Cassey D Bauer
(74) *Attorney, Agent, or Firm* — Harness, Dickey & Pierce, P.L.C.

(57) ABSTRACT

An ejector includes a body having a nozzle passage that depressurizes a refrigerant flowing out of a swirling space in which the refrigerant is swirled, a suction passage that draws a refrigerant from an external, and a diffuser passage that mixes an ejection refrigerant jetted from the nozzle passage and a suction refrigerant drawn from the suction passage together and pressurizes the mixed refrigerant. The body also has a gas-liquid separation space that separates the refrigerant flowing out of the diffuser passage into gas and liquid by an action of a centrifugal force, and multiple liquid-phase refrigerant outflow passages through which the liquid-phase refrigerant separated by the gas-liquid separation space flows out to the multiple evaporators.

9 Claims, 7 Drawing Sheets

(51) Int. Cl.
*F25B 5/02* (2006.01)
*F25B 41/06* (2006.01)
*F25B 40/02* (2006.01)
*B60H 1/32* (2006.01)

(52) U.S. Cl.
CPC ...... *B60H 2001/3298* (2013.01); *F25B 40/02* (2013.01); *F25B 2341/0012* (2013.01); *F25B 2400/23* (2013.01); *F25B 2500/18* (2013.01)

(56) References Cited

U.S. PATENT DOCUMENTS

| | | |
|---|---|---|
| 2002/0000095 A1 | 1/2002 | Takeuchi et al. |
| 2007/0271942 A1* | 11/2007 | Yokoyama ............ F25B 41/00 62/278 |
| 2008/0000263 A1 | 1/2008 | Oomura et al. |
| 2012/0247146 A1 | 10/2012 | Yamada et al. |
| 2013/0305776 A1 | 11/2013 | Alahyari et al. |
| 2014/0020424 A1 | 1/2014 | Suzuki et al. |

FOREIGN PATENT DOCUMENTS

| | | |
|---|---|---|
| JP | 3322263 B1 | 9/2002 |
| JP | 3331604 B2 | 10/2002 |
| JP | 2003014318 A | 1/2003 |
| JP | 2003343932 A | 12/2003 |
| JP | 2005249315 A | 9/2005 |
| JP | 2008008599 A | 1/2008 |
| JP | 2008202812 A | 9/2008 |
| JP | 2008232458 A | 10/2008 |
| JP | 2010210111 A | 9/2010 |
| JP | 2012202652 A | 10/2012 |
| JP | 2012202653 A | 10/2012 |
| JP | 2013177879 A | 9/2013 |
| WO | WO-2012108982 A1 | 8/2012 |
| WO | WO-2014103276 A1 | 7/2014 |

OTHER PUBLICATIONS

International Search Report and Written Opinion (in Japanese with English Translation) for PCT/JP2013/007526, mailed Mar. 25, 2014; ISA/JP.

* cited by examiner

EJECTOR

CROSS REFERENCE TO RELATED APPLICATIONS

This application is a U.S. National Phase Application under 35 U.S.C. 371 of International Application No. PCT/JP2013/007526 filed on Dec. 23, 2013 and published in Japanese as WO 2014/103277 A1 on Jul. 3, 2014. This application is based on and claims the benefit of priority from Japanese Patent Applications No. 2012-285646 filed on Dec. 27, 2012, and No. 2013-233018 filed on Nov. 11, 2013. The entire disclosures of all of the above applications are incorporated herein by reference.

TECHNICAL FIELD

The present disclosure relates to an ejector that depressurizes a fluid, and draws the fluid by a suction action of an ejection fluid ejected at high speed.

BACKGROUND ART

Conventionally, a vapor compression refrigeration cycle device having an ejector as depressurizing means (hereinafter referred to as "ejector refrigeration cycle") has been known. For example, Patent Document 1 discloses an ejector refrigeration cycle of this type in which multiple evaporators for cooling different spaces to be cooled are provided, and the respective evaporators are connected in parallel to each other.

In more detail, the ejector refrigeration cycle disclosed in Patent Document 1 has a cycle configuration that includes gas-liquid separation means for separating a refrigerant flowing out of a diffuser portion (pressurizing part) into gas and liquid, distributes a liquid-phase refrigerant separated by the gas-liquid separation means to multiple evaporators, merges the respective refrigerants flowing out of the multiple evaporators, and guides the merged refrigerant to a refrigerant suction port of the ejector.

However, in the cycle configuration of the above type, for example, if a passage pressure loss of a refrigerant path extending from the gas-liquid separation means to the refrigerant suction port through a first evaporator is different from a passage pressure loss of a refrigerant path extending from the gas-liquid separation means to the refrigerant suction port through a second evaporator, the refrigerant hardly flows into the refrigerant passage larger in the passage pressure loss. As a result, a sufficient amount of refrigerant cannot occasionally appropriately be supplied to an evaporator arranged in a refrigerant passage large in the passage pressure loss.

Under the circumstances, in the ejector refrigeration cycle of Patent Document 1, a refrigerant suction capability of the ejector is improved with the configuration of a so-called supercritical refrigeration cycle in which a pressure of a high pressure side refrigerant of the cycle which flows into a nozzle portion of the ejector becomes equal to or higher than a critical pressure of the refrigerant. The refrigerant is drawn from a downstream side of the multiple evaporators with the high suction capability, to thereby appropriately supply the refrigerant to the respective evaporators.

PRIOR ART DOCUMENT

Patent Document

Patent Document 1: JP 2003-343932

SUMMARY OF THE INVENTION

However, in the ejector refrigeration cycle of Patent Document 1, an improvement in the refrigerant suction capability of the ejector cannot be expected with the configuration of a so-called "subcritical refrigeration cycle" in which the pressure of the high pressure side refrigerant becomes lower than the critical pressure of the refrigerant. Therefore, there is a risk that the refrigerant cannot be appropriately supplied to the respective evaporators by drawing the refrigerant from the downstream side of the multiple evaporators with the high suction capability.

On the contrary, means for appropriately supplying a sufficient amount of refrigerant to the multiple evaporators by pumping the refrigerant from an upstream side of the multiple evaporators with the use of a velocity energy (kinetic energy) of the refrigerant flowing out of the gas-liquid separation means is conceived. However, in the diffuser portion of the ejector, since the velocity energy of the refrigerant is converted into a pressure energy to pressurize the refrigerant, a flow rate of the refrigerant flowing out of the diffuser portion is liable to decrease.

Further, as with the ejector refrigeration cycle of Patent Document 1, in a configuration where the refrigerant flowing out of the diffuser portion flows into the gas-liquid separation means configured separately from the ejector, a flow rate of the refrigerant in the gas-liquid separation means decreases more than a flow rate of the refrigerant immediately after flowing out of the diffuser portion. Therefore, it is difficult to appropriately supply a sufficient amount of refrigerant to the multiple evaporators with the use of the kinetic energy of the refrigerant flowing out of the gas-liquid separation means.

That is, in order to appropriately supply the refrigerant to the multiple evaporators with the use of the kinetic energy of the refrigerant flowing out of the gas-liquid separation means, it is necessary to improve the kinetic energy of the refrigerant flowing from the diffuser portion to the gas-liquid separation means. Also, it is necessary to configure the ejector and the gas-liquid separation means which can effectively utilize the kinetic energy.

In view of the above, it is an objective of the present disclosure to provide an ejector that is integrated with gas-liquid separation device, the ejector being capable of appropriately supplying a refrigerant to multiple evaporators when being applied to a refrigeration cycle device having the multiple evaporators which are connected in parallel to each other.

According to an aspect of the present disclosure, an ejector is used for a vapor compression refrigeration cycle device having an evaporator that evaporates a refrigerant. The ejector includes: (i) a body including a refrigerant inlet port, a swirling space in which a refrigerant flowing from the refrigerant inlet port is swirled, a depressurizing space in which the refrigerant flowing out of the swirling space is depressurized, a suction passage that communicates with a downstream side of the depressurizing space in a refrigerant flow and draws the refrigerant from an external, and a pressurizing space in which an ejection refrigerant jetted from the depressurizing space is mixed with a suction refrigerant drawn from the suction passage; and (ii) a passage formation member which is at least partially arranged inside the depressurizing space and inside the pressurizing space and has a conical shape having a cross-sectional area that increases with distance from the depressurizing space. A refrigerant passage provided between an inner peripheral surface of a portion of the body, which defines the depressurizing space, and an outer peripheral surface of the passage formation member is a nozzle passage functioning as a nozzle that depressurizes and jets the refrigerant flowing out of the swirling space. A refrigerant passage provided between an inner peripheral surface of a portion of the body, which defines the pressurizing space, and an outer peripheral surface of the passage formation member is a diffuser passage functioning as a diffuser that mixes the ejection refrigerant and the suction refrigerant together and pressurizes the mixed refrigerant. The diffuser passage has an annular shape in a cross-section surface perpendicular to an axial direction of the passage formation member. The body further includes a gas-liquid separation space that separates the refrigerant flowing out of the pressurizing space into gas and liquid by the action of a centrifugal force, and a plurality of liquid-phase refrigerant outflow passages through which the liquid-phase refrigerant separated by the gas-liquid separation space flows out to the evaporator.

According to the above configuration, the refrigerant swirls in the swirling space with the results that a refrigerant pressure on a swirling center side within the swirling space can be reduced to a pressure of a saturated liquid-phase refrigerant, or a pressure at which the refrigerant is depressurized and boiled (cavitation occurs). Therefore, it is made possible that a larger amount of gas-phase refrigerant is present on an inner peripheral side than on an outer peripheral side of a swirling center axis. This leads to a two-phase separation state in which the refrigerant has a gas single phase in the vicinity of a swirling center line within the swirling space, and has a liquid single phase around the vicinity thereof.

The refrigerant of the two-phase separation state flows into the nozzle passage, and boiling of the refrigerant is promoted by wall surface boiling and interface boiling. Therefore, the refrigerant puts into a gas-liquid mixed state in which a gas phase and a liquid phase are homogeneously mixed together in the vicinity of a minimum flow area part of the nozzle passage. Further, the refrigerant which has put into the gas-liquid mixed state is blocked (choked) in the vicinity of the minimum flow area part of the nozzle passage, and a flow rate of the refrigerant in the gas-liquid mixed state is accelerated to a two-phase sonic speed.

The refrigerant thus accelerated to the two-phase sonic speed becomes an ideal two-phase spray flow in which the two phases are homogeneously mixed together on a downstream side of the minimum flow area part in the nozzle passage, and the flow rate can be made to further increase. As a result, the energy conversion efficiency in converting a pressure energy of the refrigerant into a velocity energy in the nozzle passage can be improved.

Further, in the diffuser passage, the refrigerant increased in speed with a high energy conversion efficiency in a nozzle passage can be introduced directly into the gas-liquid separation space. Therefore, as compared with a case in which the refrigerant flowing out of the ejector flows into the gas-liquid separation device configured separately from the ejector, a flow rate of the refrigerant flowing into the gas-liquid separation space can increase.

That is, the kinetic energy of the refrigerant flowing out of the diffuser passage and flowing into the gas-liquid separation space can increase. The refrigerant can flow out to the evaporators from the liquid-phase refrigerant outflow passage with the use of the kinetic energy.

Since the outlet side of the multiple liquid-phase refrigerant outflow passage is connected to the multiple evaporators which are connected in parallel to each other, the refrigerant can be appropriately supplied to the respective evaporators by effectively utilizing the kinetic energy of the refrigerant flowing into the gas-liquid separation space.

In other words, the ejector integrated with the gas-liquid separation device can be provided, and the ejector is capable of appropriately supplying the refrigerant to the multiple evaporators when being applied to the refrigeration cycle device having the multiple evaporators which are connected in parallel to each other.

Further, since the flow rate of the refrigerant flowing into the gas-liquid separation space can be made to increase, the gas-liquid separation performance in the gas-liquid separation space can be improved, and a capacity of the gas-liquid separation space can be effectively reduced.

In the ejector described above, the gas-liquid separation space may have a shape of a solid of revolution and be arranged coaxially with the passage formation member. In a cross-section perpendicular to the axial direction of the gas-liquid separation space, the plurality of liquid-phase refrigerant outflow passages may be arranged symmetrically with respect to an axial center of the gas-liquid separation space.

In the ejector described above, the gas-liquid separation space may have a shape of a solid of revolution and be arranged coaxially with the passage formation member. A flowing direction of the refrigerant from the gas-liquid separation space to the liquid-phase refrigerant outflow passages may be a tangential direction of the inner peripheral wall surface of the gas-liquid separation space.

In the ejector described above, inlet portions of the plurality of liquid-phase refrigerant outflow passages, which are open in the gas-liquid separation space, may be arranged at equal angular intervals with respect to the axial center of the gas-liquid separation space in a cross-section surface perpendicular to the axial direction of the gas-liquid separation space.

With the above configuration, a kinetic energy of the refrigerant swirling at a high speed is effectively utilized, and the refrigerant can be appropriately supplied to the multiple evaporators. In other words, since states of the refrigerant on the inlet sides of the respective liquid-phase refrigerant outflow passages can be equalized irrespective of the change in operation condition of the ejector refrigeration cycle and the like, the refrigerant can be appropriately supplied to the multiple evaporators.

The above-described ejector may include a swirling promotion portion that promotes the swirling of the refrigerant flowing out of the diffuser passage around an axis of the passage formation member.

According to the above configuration, the velocity component of the refrigerant flowing into the gas-liquid separation space in the swirling direction can be made to increase. Therefore, the gas-liquid separation performance in the gas-liquid separation space can be improved. Also, the refrigerant can be further appropriately supplied to the respective evaporators with the increase in the kinetic energy of the refrigerant in the gas-liquid separation space.

Further, even if the refrigerant flowing through the diffuser passage swirls around the axis of the communication formation member, the gas-liquid separation performance in the gas-liquid separation space can be improved, likewise. Also, the refrigerant can be further appropriately supplied to the respective evaporators.

The passage formation member is not strictly limited to one having only the shape in which the sectional area increases with distance from the depressurizing space. At least a part of the passage formation member may include a shape with the sectional area thereof expanded with distance from the depressurizing space, and the diffuser passage has a shape expanding outward with distance from the depressurizing space according to the shape of the passage formation member.

In addition, the "formed into a conical shape" is not limited to a meaning that the passage formation member is formed into a complete conical shape, but also includes meaning of a shape close to cone or a shape partially including the conical shape. Specifically, the cross-sectional shape taken along the axial direction is not limited to an isosceles triangle, but includes a shape in which two sides between which a vertex is sandwiched are convexed on a radially inner side, a shape in which the two sides between which the vertex is sandwiched are convexed on a radially outer side, and a shape in which the cross-sectional shape is semicircular.

EMBODIMENTS FOR EXPLOITATION OF THE INVENTION

Figure 1:
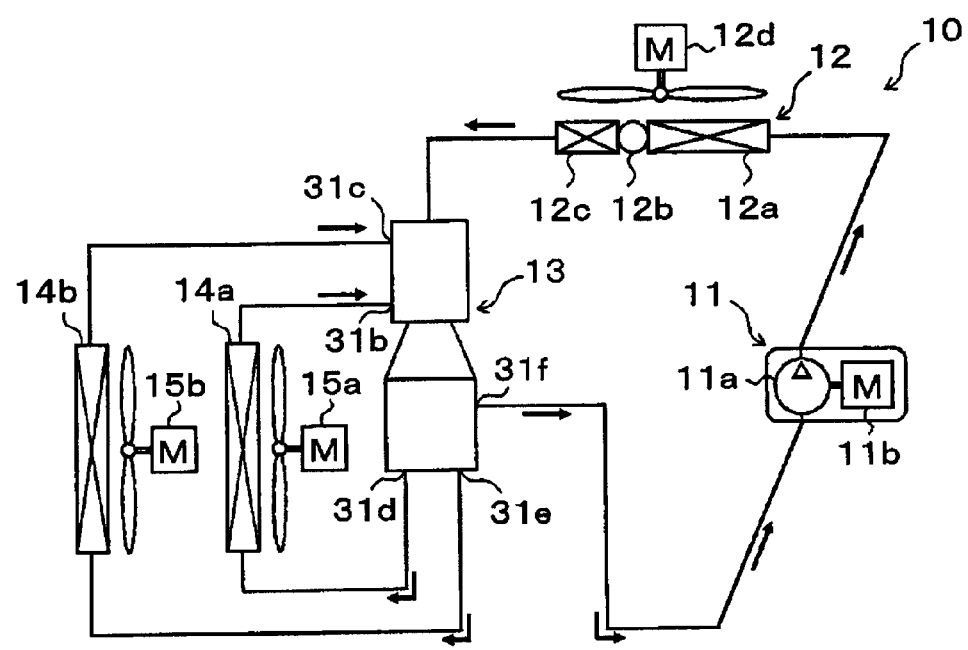
FIG. 1 is a schematic diagram of an ejector refrigeration cycle according to a first embodiment.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

A first embodiment of the present disclosure will be described with reference to FIGS. 1 to 6. An ejector 13 according to this embodiment is applied to a vapor compression refrigeration cycle device having an ejector as refrigerant depressurizing device, that is, an ejector refrigeration cycle 10. Moreover, the ejector refrigeration cycle 10 is applied to a so-called "dual air conditioning vehicle air conditioning apparatus", and performs a function of cooling blast air which is blown into a vehicle interior that is a space to be air-conditioned.

The dual air conditioning vehicle air conditioning apparatus includes a front seat air conditioning unit for blowing the conditioned air mainly toward an area on the front seat side in the vehicle interior, and a rear seat air conditioning unit for blowing the conditioned air mainly toward an area on the rear seat side. A front seat evaporator 14a and a rear seat evaporator 14b for evaporating a low pressure refrigerant in the ejector refrigeration cycle 10 are arranged in the air passages of the blast air provided in the respective units. In other words, the ejector refrigeration cycle 10 according to this embodiment is equipped with the multiple evaporators.

Next, a detailed configuration of the ejector refrigeration cycle 10 will be described. In the ejector refrigeration cycle 10, a compressor 11 draws a refrigerant, pressurizes the refrigerant to a high pressure refrigerant, and discharges the pressurized refrigerant. Specifically, the compressor 11 of this embodiment is an electric compressor in which a fixed-capacity compression mechanism 11a and an electric motor 11b for driving the compression mechanism 11a are accommodated in one housing.

Various compression mechanisms, such as a scroll-type compression mechanism and a vane-type compression mechanism, can be employed as the compression mechanism 11a. Further, the operation (rotating speed) of the electric motor 11b is controlled according to a control signal that is output from a control device to be described below, and any one of an AC motor and a DC motor may be employed as the electric motor 11b.

A refrigerant inlet side of a condenser 12a of a heat radiator 12 is connected to a discharge port of the compressor 11. The heat radiator 12 is a heat exchanger for heat radiation which cools a high-pressure refrigerant, which is discharged from the compressor 11, through the radiation of heat by exchanging heat between the high-pressure refrigerant and vehicle exterior air (outside air) that is blown by a cooling fan 12d.

More specifically, the heat radiator 12 is a so-called subcooling condenser including: a condenser 12a that condenses a high-pressure gas-phase refrigerant, which is discharged from the compressor 11, through the radiation of heat by exchanging heat between the high-pressure gas-phase refrigerant and the outside air, which is blown from the cooling fan 12d; a receiver part 12b that separates gas and liquid of the refrigerant having flowed out of the condenser 12a and stores a surplus liquid-phase refrigerant; and a subcooling part 12c that subcools a liquid-phase refrigerant having flowed out of the receiver part 12b by exchanging heat between the liquid-phase refrigerant and the outside air blown from the cooling fan 12d.

Meanwhile, the ejector refrigeration cycle 10 employs an HFC based refrigerant (specifically, R134a) as the refrigerant, and forms a subcritical refrigeration cycle in which a high pressure side refrigerant pressure does not exceed a critical pressure of the refrigerant. The ejector refrigeration cycle 10 may employ an HFO based refrigerant (specifically, R1234yf) or the like as the refrigerant. Furthermore, refrigerator oil for lubricating the compressor 11 is mixed with the refrigerant, and a part of the refrigerator oil circulates in the cycle together with the refrigerant.

The cooling fan 12d is an electric blower the rotating speed (the amount of blown air) of which is controlled by a control voltage output from the control device. A refrigerant inlet port 31a of the ejector 13 is connected to a refrigerant outlet side of the subcooling portion 12c of the heat radiator 12.

The ejector 13 functions as a refrigerant depressurizing device that depressurizes the high pressure liquid-phase refrigerant of the subcooling state, which flows out from the heat radiator 12, and allowing the refrigerant to flow out to the downstream side, and also functions as a refrigerant circulating device (refrigerant transport device) that draws (transports) the refrigerants flowing out from the front seat evaporator 14a and the rear seat evaporator 14b by the suction action of a refrigerant flow ejected at high speed to circulate the refrigerant. Further, the ejector 13 according to this embodiment also functions as a gas-liquid separation device that separates the depressurized refrigerant into gas and liquid.

A specific configuration of the ejector 13 will be described with reference to FIGS. 2 to 5. Meanwhile, up and down arrows in FIGS. 2 and 3 indicate respective up and down directions in a state where the ejector refrigeration cycle 10 is mounted on a vehicle air conditioning apparatus. FIG. 4 is a schematic cross-sectional view illustrating functions of respective refrigerant passages of the ejector 13.

Figure 2:
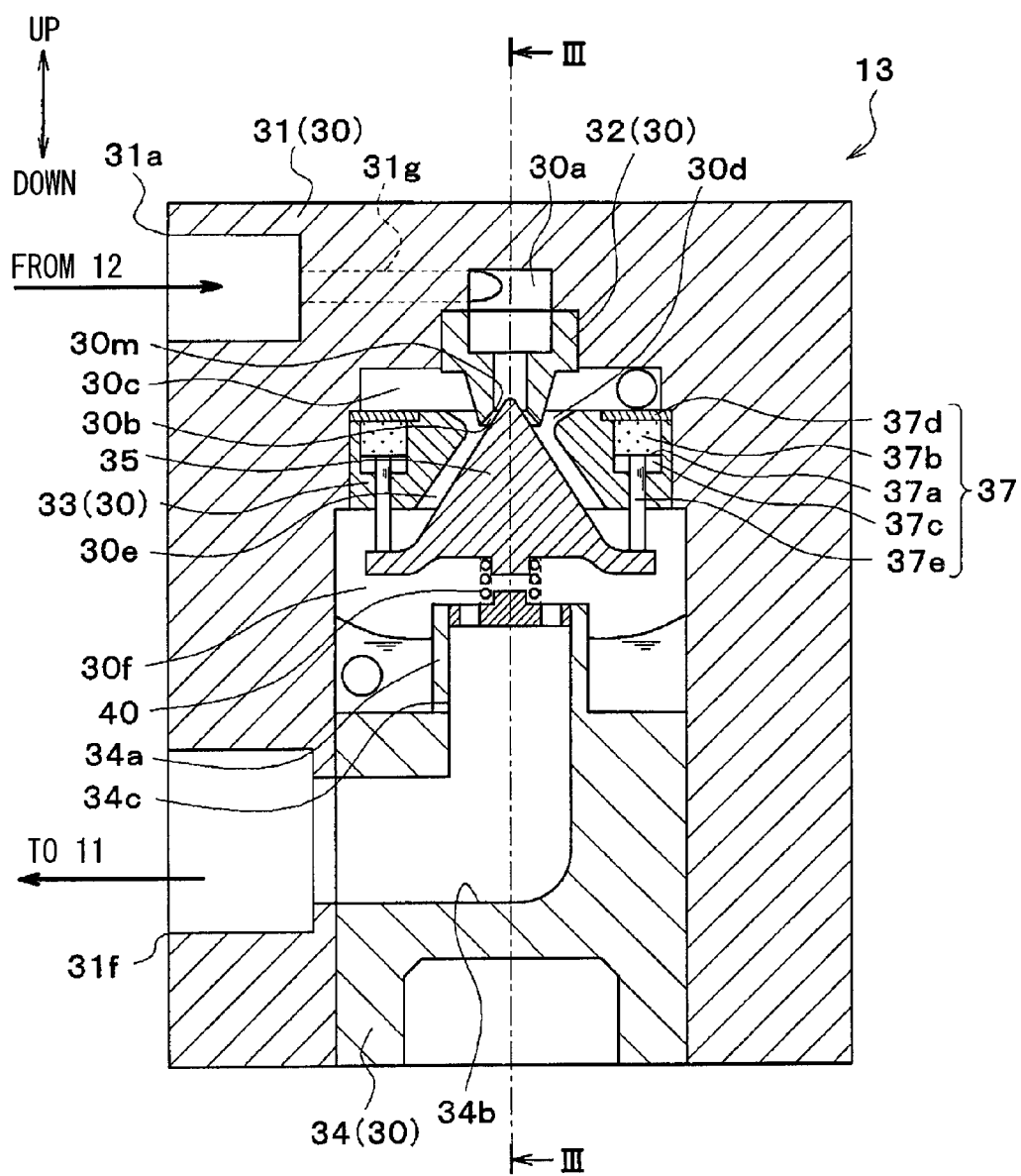
FIG. 2 is a sectional view of the ejector taken along an axial direction thereof according to the first embodiment.
Figure 3:
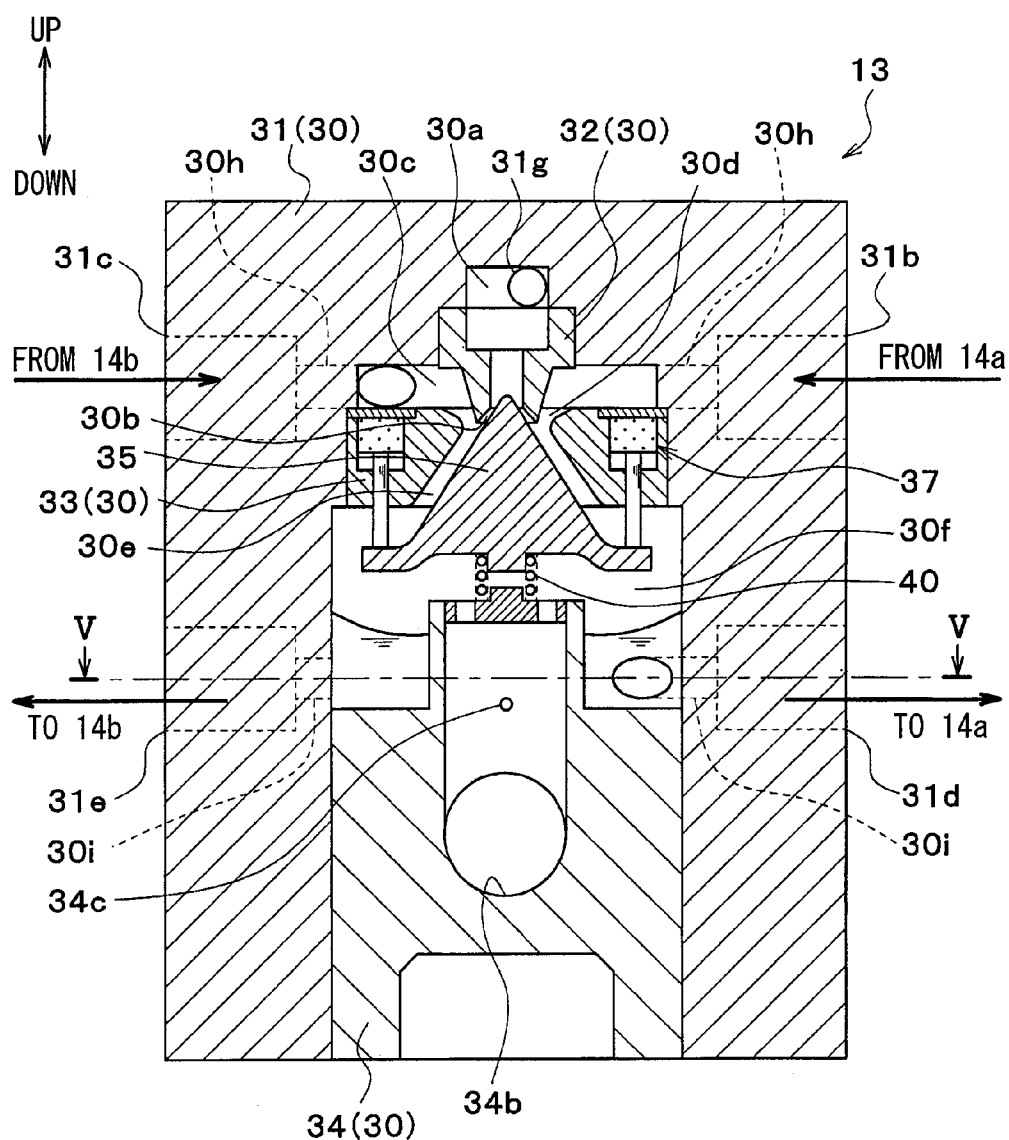
FIG. 3 is a sectional view taken along a line III-III of FIG. 2.
Figure 4:
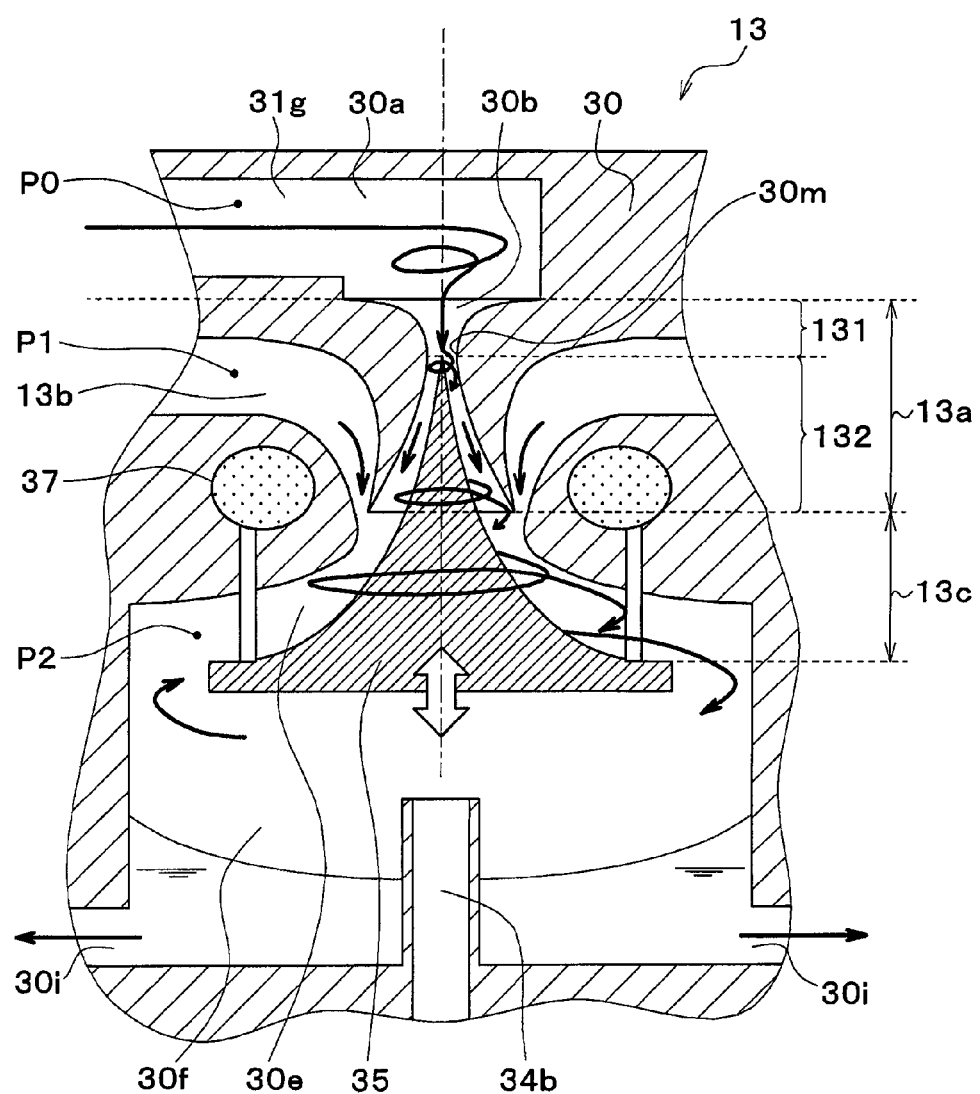
FIG. 4 is a schematic sectional diagram of the ejector according to the first embodiment.

First, as illustrated in FIGS. 2 and 3, the ejector 13 according to this embodiment includes a body 30 configured by the combination of multiple components. Specifically, the body 30 has a housing body 31 made of prismatic metal, and forming an outer shell of the ejector 13. A nozzle body 32, a middle body 33, and a lower body 34 are fixed to an interior of the housing body 31.

As illustrated in FIGS. 2 and 3, the housing body 31 is formed with a refrigerant inlet port 31a through which the refrigerant flowing out of the heat radiator 12 flows into the housing body 31, a first refrigerant suction port 31b that draws the refrigerant flowing out of the front seat evaporator 14a, and a second refrigerant suction port 31c that draws the refrigerant flowing out of the rear seat evaporator 14b. The housing body 31 is also formed with a first liquid-phase refrigerant outflow port 31d that allows the liquid-phase refrigerant separated by the gas-liquid separation space 30f formed in the body 30 to flow out to the refrigerant inlet side of the front seat evaporator 14a, a second liquid-phase refrigerant outflow port 31e that allows the liquid-phase refrigerant separated by the gas-liquid separation space 30f to flow out to the refrigerant inlet side of the rear seat evaporator 14b, and a gas-phase refrigerant outflow port 31f that allows the gas-phase refrigerant separated by the gas-liquid separation space 30f to flow out to the suction side of the compressor 11.

The nozzle body 32 is formed of a substantially conically-shaped metal member that is tapered in a refrigerant flow direction. The nozzle body 32 is fixed to the interior of the housing body 31 by means such as press fitting so that an axial direction of the nozzle body 32 is parallel to a vertical direction (up-down direction in FIGS. 2 and 3). A swirling space 30a in which the refrigerant that has flowed in from the refrigerant inlet port 31a is swirled is provided between an upper side of the nozzle body 32 and the housing body 31.

The swirling space 30a is formed into a shape of a solid of revolution, and a center axis of the swirling space 30a extends in the vertical direction. Meanwhile, the shape of a solid of revolution is a solid shape formed by rotating a plane figure around one straight line (center axis) coplanar with the plane figure. More specifically, the swirling space 30a according to this embodiment is defined into a substantially cylindrical shape. The swirling space 30a may be defined in a shape in which a circular cone or a circular truncated cone is combined with a cylinder, or the like.

Further, the refrigerant inlet passage 31g that connects the refrigerant inlet port 31a and the swirling space 30a extends in a tangential direction of an inner wall surface of the swirling space 30a when viewed in a center axis direction of the swirling space 30a. With this configuration, the refrigerant that has flowed into the swirling space 30a from the refrigerant inlet passage 31g flows along an inner wall surface of the swirling space 30a, and swirls within the swirling space 30a.

Meanwhile, the refrigerant inlet passage 31g does not need to be defined to completely match the tangential direction of the swirling space 30a when viewed in the center axis direction of the swirling space 30a. If the refrigerant inlet passage 31g includes at least a component in the tangential direction of the swirling space 30a, the refrigerant inlet passage 31g may be defined to include components in the other directions (for example, components in the axial direction of the swirling space 30a).

Since a centrifugal force acts on the refrigerant swirling in the swirling space 30a, the pressure of a refrigerant present on the center axis side becomes lower than the pressure of a refrigerant present on the outer peripheral side in the swirling space 30a. Accordingly, in this embodiment, during the normal operation of the ejector refrigeration cycle 10, the pressure of a refrigerant present on the center axis side in the swirling space 30a is lowered to a pressure at which a liquid-phase refrigerant is saturated or a pressure at which a refrigerant is decompressed and boiled (cavitation occurs).

The adjustment of the pressure of a refrigerant present on the center axis side in the swirling space 30a can be realized by adjusting the swirling flow rate of the refrigerant swirling in the swirling space 30a. Further, the swirling flow rate can be conducted by, for example, adjusting an area ratio between the passage sectional area of the refrigerant inlet passage 31g and the sectional area of the swirling space 30a perpendicular to the axial direction. Meanwhile, the swirling flow rate in this embodiment means the flow rate of the refrigerant in the swirling direction in the vicinity of the outermost peripheral part of the swirling space 30a.

A depressurizing space 30b that allows the refrigerant flowing out from the swirling space 30a to be depressurized, and flow out to the downstream side is defined within the nozzle body 32. The depressurizing space 30b is defined into a shape of a solid of revolution, having a cylindrical space coupled with a circular truncated conical space that gradually expands in a refrigerant flow direction continuously from a lower side of the cylindrical space. A center axis of the depressurizing space 30b is arranged coaxially with the center axis of the swirling space 30a.

Further, as illustrated in FIGS. 2 and 4, a minimum passage area part 30m that is most reduced in the refrigerant passage area within the depressurizing space 30b is defined, and a passage formation member 35 that changes the passage area of the minimum passage area part 30m is arranged, within the depressurizing space 30b.

The passage formation member 35 is formed into a substantially conical shape gradually widened toward the downstream side of the refrigerant flow, and the center axis of the passage formation member 35 is arranged coaxially with the center axis of the depressurizing space 30b. In other words, the passage formation member 35 is formed into a conical shape having a cross-sectional area that increases with distance from the depressurizing space 30b.

The refrigerant passage is defined between an inner peripheral surface of a portion of the nozzle body 32 which defines the depressurizing space 30b and an outer peripheral surface of the upper side of the passage formation member 35. As illustrated in FIG. 4, the refrigerant passage includes a convergent part 131 and a divergent part 132. The convergent part 131 is formed on the upstream side of a minimum passage area part 30m in the refrigerant flow, in which the refrigerant passage area extending to the minimum passage area part 30m gradually decreases. The divergent part 132 is formed on the downstream side of the minimum passage area part 30m in the refrigerant flow, in which the refrigerant passage area gradually increases.

In the divergent part 132, since the depressurizing space 30b overlaps (overlaps) with the passage formation member 35 when viewed in the radial direction, a sectional shape of the refrigerant passage perpendicular to the axis direction is annular (doughnut shape obtained by removing a smaller-diameter circular shape arranged coaxially from the circular shape). Further, since a spread angle of the passage formation member 35 of this embodiment is smaller than a spread angle of the circular truncated conical space of the depressurizing space 30b, the refrigerant passage area of the divergent part 132 gradually enlarges toward the downstream side in the refrigerant flow.

In this embodiment, the refrigerant passage defined between the inner peripheral surface of the depressurizing space 30b and the outer peripheral surface of a top side of the passage formation member 35 is a nozzle passage 13a that functions as a nozzle. The nozzle passage 13a depressurizes the refrigerant, and also accelerates the flow rate of the refrigerant to the sonic speed, and jets the refrigerant. Further, since the refrigerant flowing into the nozzle passage 13a swirls in the swirling space 30a, the refrigerant flowing through the nozzle passage 13a, and the ejection refrigerant that is jetted from the nozzle passage 13a also have a velocity component in a direction of swirling in the same direction as that of the refrigerant swirling in the swirling space 30a.

Subsequently, as illustrated in FIGS. 2 and 3, the middle body 33 is formed of a disc-shaped member made of metal having a through-hole of a shape of a solid of revolution which penetrates through both sides thereof in the center part thereof. The middle body 33 accommodates the driving device 37 that displaces the passage formation member 35 on an outer peripheral side of the through-hole. Meanwhile, a center axis of the through-hole is arranged coaxially with the center axes of the swirling space 30a and the depressurizing space 30b. Also, the middle body 33 is fixed to the interior of the housing body 31 and the lower side of the nozzle body 32 by means such as press fitting.

Further, an inflow space 30c is provided between an upper surface of the middle body 33 and an inner wall surface of the housing body 31 facing the middle body 33, and the inflow space 30c accumulates the refrigerant flowing out of the first refrigerant suction port 31b and the second refrigerant suction port 31c. Further, in this embodiment, because a tapered tip of a lower end of the nozzle body 32 is located within the through-hole of the middle body 33, the inflow space 30c is defined into an annular shape in cross-section surface when viewed in the center axis direction of the swirling space 30a and the depressurizing space 30b.

A suction refrigerant inflow passage 30h connecting the first and second refrigerant suction ports 31b and 31c, and the inflow space 30c extends in a tangential direction of the inner peripheral wall surface of the inflow space 30c when viewed in the center axial direction of the inflow space 30c. With the above configuration, in this embodiment, the refrigerant flowing into the inflow space 30c from the first and second refrigerant suction ports 31b and 31c through the suction refrigerant inflow passage 30h are swirled in the same direction as that of the refrigerant in the swirling space 30a.

Further, in this embodiment, when viewed in a center axial direction of the inflow space 30c, the outlet portions of the multiple (two in the present embodiment) suction refrigerant inflow passages 30h which are open in the inflow space 30c are arranged at an equal angular interval (180° interval in the present embodiment) to each other with respect to the axial center of the inflow space 30c as with the multiple liquid-phase refrigerant outflow ports 31d and 31e which will be described later.

The through-hole of the middle body 33 has a part in which a refrigerant passage area is gradually reduced toward the refrigerant flow direction so as to match an outer peripheral shape of the tapered tip of the nozzle body 32 in an area where the lower side of the nozzle body 32 is inserted, that is, an area in which the middle body 33 and the nozzle body 32 overlap with each other when viewed in a radial direction perpendicular to the axis line.

Accordingly, a suction passage 30d is defined between an inner peripheral surface of the through-hole and an outer peripheral surface of the lower side of the nozzle body 32, and the inflow space 30c communicates with a downstream side of the depressurizing space 30b in the refrigerant flow through the suction passage 30d. That is, in this embodiment, a suction passage 13b that draws the refrigerant from the external is defined by the inflow space 30c, and the suction passage 30d. Further, the suction passage 13b in cross-section surface perpendicular to the center axis also has an annular shape, and the drawn refrigerant flows in the suction passage 13b from the outer peripheral side toward the inner peripheral side of the center axis while swirling.

Also, a pressurizing space 30e defined into a substantially circular truncated conical shape that gradually spreads in the refrigerant flow direction is defined in the through-hole of the middle body 33 on the downstream side of the suction passage 30d in the refrigerant flow. The pressurizing space 30e is a space in which the ejected refrigerant ejected from the above-mentioned nozzle passage 13a is mixed with the suction refrigerant drawn from the suction passage 30d.

The lower side of the above-mentioned passage formation member 35 is located in the pressurizing space 30e. Further, a spread angle of the conical-shaped side surface of the passage formation member 35 in the pressurizing space 30e is smaller than a spread angle of the circular truncated conical space of the pressurizing space 30e. Therefore, the refrigerant passage area of the refrigerant passage is gradually enlarged toward the downstream side in the refrigerant flow.

In this embodiment, the refrigerant passage area is enlarged as above. Thus, the refrigerant passage, which is defined between the inner peripheral surface of the middle body 33 and the outer peripheral surface of the lower side of the passage formation member 35 and configures the pressurizing space 30e, is defined as a diffuser passage 13c which functions as a diffuser. The diffuser passage 13c converts velocity energies of a mixed refrigerant of the ejection refrigerant and the suction refrigerant into a pressure energy. That is, in the diffuser passage 13c, the ejection refrigerant and the suction refrigerant are mixed together, and pressurized.

Further, a cross-section of the diffuser passage 13c perpendicular to the center axis thereof also has an annular shape. As schematically illustrated in FIG. 4, the refrigerant that flows through the diffuser passage 13c also has a velocity component in a direction of swirling in the same direction as that of the refrigerant swirling in the swirling space 30a.

Next, the driving device 37 that is arranged within the middle body 33 and displaces the passage formation member 35 will be described. The driving device 37 is configured with a circular laminated diaphragm 37a which is a pressure responsive member. More specifically, as illustrated in FIG. 2, the diaphragm 37a is fixed by means such as welding so as to partition a cylindrical space defined on the outer peripheral side of the middle body 33 into two upper and lower spaces.

The upper space (the inflow space 30c side) of the two spaces partitioned by the diaphragm 37a configures a sealed space 37b in which a temperature sensitive medium is enclosed. A pressure of the temperature sensitive medium changes according to a temperature of the merged refrigerant of the outflow refrigerant of the front seat evaporator 14a and the outflow refrigerant of the rear seat evaporator 14b, which is merged in the inflow space 30c. The temperature sensitive medium, which has the same composition as that of a refrigerant circulating in the refrigeration cycle 10, is enclosed in the sealed space 37b so as to have a predetermined density. Accordingly, the temperature sensitive medium of this embodiment is medium mainly containing R134a.

On the other hand, the lower space of the two spaces partitioned by the diaphragm 37a configures an introduction space 37c into which the merged refrigerant merged in the inflow space 30c is introduced through a non-shown communication channel. Therefore, the temperature of the merged refrigerant is transmitted to the temperature sensitive medium enclosed in the sealed space 37b via a cap member 37d and the diaphragm 37a. The cap member 37d partitions the inflow space 30c and the sealed space 37b.

In this example, as apparent from FIGS. 2 to 4, in this embodiment, the suction passage 13b is arranged on the upper side of the middle body 33, and the diffuser passage 13c is arranged on the lower side of the middle body 33. Therefore, at least a part of the driving device 37 is arranged at a position sandwiched by the suction passage 13b and the diffuser passage 13c from the vertical direction when viewed in the radial direction of the axis line.

In more detail, the sealed space 37b of the driving device 37 is arranged at a position where the suction passage 13b overlaps with the diffuser passage 13c and at a position surrounded by the suction passage 13b and the diffuser passage 13c when viewed in a center axis direction of the swirling space 30a and the passage formation member 35. With the above configuration, the temperature of the merged refrigerant merged in the inflow space 30c is efficiently transmitted to the temperature sensitive medium in the sealed space 37b, and an inner pressure in the sealed space 37b becomes a pressure corresponding to the temperature of the merged refrigerant.

Further, the diaphragm 37a is deformed according to a differential pressure between the internal pressure of the sealed space 37b and the pressure of the merged refrigerant flowing into the introduction space 37c. For that reason, it is preferable that the diaphragm 37a is made of a material rich in elasticity, excellent in heat conduction, and tough. For example, it is desirable that the diaphragm 37a is formed of a metal laminate made of stainless steel (SUS304).

An upper end side of a cylindrical actuating bar 37e is joined to a center part of the diaphragm 37a by means such as welding, and a lower end side of the actuating bar 37e is fixed to a radially-outer and lowermost side (bottom side) of the passage formation member 35. With this configuration, the diaphragm 37a and the passage formation member 35 are coupled with each other, and the passage formation member 35 is displaced in accordance with a displacement of the diaphragm 37a to regulate the refrigerant passage area of the nozzle portion 13a (passage cross-sectional area in the minimum passage area part 30m).

Specifically, when the temperature (the degree of superheat) of the merged refrigerant merged in the inflow space 30c rises, a saturated pressure of the temperature sensitive medium enclosed in the sealed space 37b rises to increase a differential pressure obtained by subtracting the pressure of the introduction space 37c from the internal pressure of the sealed space 37b. Accordingly, the diaphragm 37a displaces the passage formation member 35 in a direction of enlarging the passage cross-sectional area in the minimum passage area part 30m (downward in the vertical direction).

On the other hand, when the temperature (the degree of superheat) of the merged refrigerant merged in the inflow space 30c falls, a saturated pressure of the temperature sensitive medium sealed in the sealed space 37b falls to decrease the differential pressure obtained by subtracting the pressure of the introduction space 37c from the internal pressure of the sealed space 37b. With the above configuration, the diaphragm 37a displaces the passage formation member 35 in a direction of reducing the passage cross-sectional area of the minimum passage area part 30m (toward the upper side in the vertical direction).

The diaphragm 37a displaces the passage formation member 35 vertically according to the degree of superheating of the merged medium which is merged in the inflow space 30c as described above. As a result, the passage cross-sectional area of the minimum passage area part 30m can be regulated so that the degree of superheating of the merged refrigerant comes closer to a predetermined value. A gap between the actuating bar 37e and the middle body 33 is sealed by a seal member such as an O-ring not shown, and the refrigerant is not leaked through the gap even if the actuating bar 37e is displaced.

The bottom of the passage formation member 35 is subjected to a load of a coil spring 40 fixed to the lower body 34. The coil spring 40 exerts the load urging the passage formation member 35 so as to reduce the passage cross-sectional area in the minimum passage area part 30m. With the regulation of this load, a valve opening pressure of the passage formation member 35 can be changed to change a target degree of superheat.

Incidentally, in this embodiment, the multiple (specifically, four as illustrated in FIGS. 2 and 3) cylindrical spaces are provided in the part of the middle body 33 on the radially outer side, and the respective circular laminated diaphragms 37a are fixed in those spaces to configure four driving devices 37. However, the number of driving devices 37 is not limited to this number. When the driving devices 37 are provided at plural locations, it is desirable that the driving devices 37 are arranged at regular angular intervals with respect to the respective center axes.

Alternatively, a diaphragm formed of the annular thin plate may be fixed in a space having an annular shape when viewed in the axial direction, and the diaphragm and the passage formation member 35 may be coupled with each other by multiple actuating bars.

Next, the lower body 34 is formed of a circular-cylindrical metal member, and fixed in the housing body 31 by means such as screwing so as to close a bottom of the housing body 31. As illustrated in FIGS. 2 and 3, the gas-liquid separation space 30f that separates gas and liquid of the refrigerant that has flowed out of the diffuser passage 13c from each other is defined between the upper side of the lower body 34 and the middle body 33.

The gas-liquid separation space 30f is defined as a space having a shape of a solid of revolution, such as a substantially cylindrical shape, and the center axis of the gas-liquid separation space 30f is also arranged coaxially with the center axes of the swirling space 30a, the depressurizing space 30b, and the passage formation member 35.

As described above, the refrigerant flows in the diffuser passage 13c along the refrigerant passage having an annular cross-section shape while swirling. Therefore, the refrigerant that flows from the diffuser passage 13c into the gas-liquid separation space 30f also has a velocity component in the swirling direction. Therefore, the gas and liquid of refrigerant are separated by the action of the centrifugal force within the gas-liquid separation space 30f in this embodiment. In addition, an internal capacity of the gas-liquid separation space 30f has a volume insufficient to substantially accumulate excess refrigerant even if a load variation occurs in the cycle, and the refrigerant circulation flow rate circulating in the cycle is varied.

A cylindrical pipe 34a that is arranged coaxially with the gas-liquid separation space 30f and extends upward is disposed in the center part of the lower body 34. The liquid-phase refrigerant separated by the gas-liquid separation space 30f is temporarily retained on the outer peripheral side of the pipe 34a, and flows out of the liquid-phase refrigerant outflow port 31d, 31e. Also, a gas-phase refrigerant outflow passage 34b is defined inside the pipe 34a and guides the gas-phase refrigerant separated in the gas-liquid separation space 30f to the gas-phase refrigerant outflow port 31f of the housing body 31.

Further, the above-mentioned coil spring 40 is fixed to an upper end of the pipe 34a. The coil spring 40 also functions as a vibration absorbing member that attenuates the vibration of the passage formation member 35, which is caused by a pressure pulsation generated when the refrigerant is depressurized. Additionally, an oil return hole 34c for returning a refrigerator oil in the liquid-phase refrigerant into the compressor 11 through the gas-phase refrigerant outflow passage 34b is defined on a base part (lowermost part) of the pipe 34a.

Figure 5:
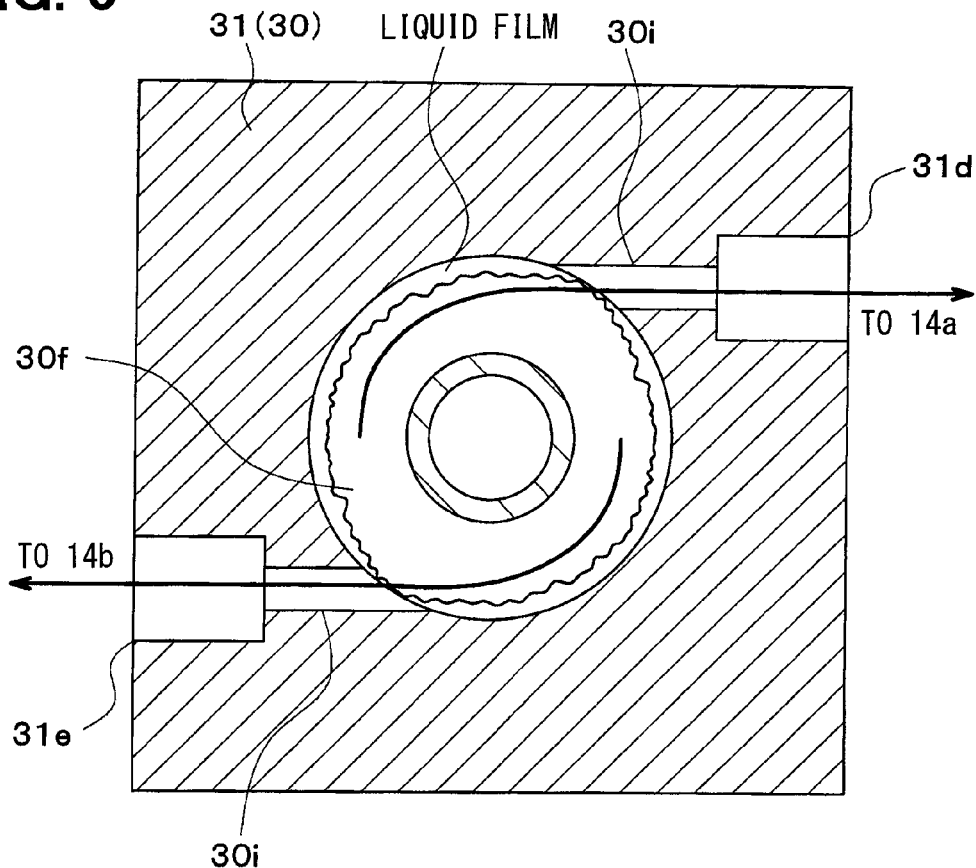
FIG. 5 is a cross-sectional view taken along a line V-V in FIG. 3.

Also, as illustrated in a cross-sectional view of FIG. 5, the liquid-phase refrigerant outflow passages 30i that connect the gas-liquid separation space 30f and the second liquid-phase refrigerant outflow ports 31d, 31e are arranged symmetrically with respect to the axial center of the gas-liquid separation space 30f when viewed in the center axial direction of the gas-liquid separation space 30f. Further, the liquid-phase refrigerant outflow passages 30i extend in a tangential direction of an inner peripheral wall surface of the gas-liquid separation space 30f. Further, the inlet portions of the multiple (two in this embodiment) liquid-phase refrigerant outflow passages 30i which are open in the gas-liquid separation space 30f are arranged at an equal angular interval (180° interval in this embodiment) to each other with respect to the axial center of the gas-liquid separation space 30f.

Further, in this embodiment, a passage pressure loss of the liquid-phase refrigerant outflow passage 30i connecting the gas-liquid separation space 30f and the first liquid-phase refrigerant outflow port 31d is set to be larger than a passage pressure loss of the liquid-phase refrigerant outflow passage 30i connecting the gas-liquid separation space 30f and the second liquid-phase refrigerant outflow port 31e.

The above adjustment of the passage pressure loss may be performed by adjusting the passage cross-sectional area of the liquid-phase refrigerant outflow passages 30i, or may be performed by arranging a fixed aperture such as an orifice in the liquid-phase refrigerant outflow passages 30i. The "passage pressure loss" means a pressure loss occurring when a predetermined flow rate of refrigerant flows through the refrigerant passage.

Subsequently, as illustrated in FIG. 1, the first liquid-phase refrigerant outflow port 31d is connected with a refrigerant inlet side of the front seat evaporator 14a arranged in the air passage of the front seat air conditioning unit. The front seat evaporator 14a is a heat exchanger for cooling configured to exchange heat between the low-pressure refrigerant depressurized by the ejector 13 and the blast air blown to the vehicle interior front side from the front seat blower fan 15a to evaporate the low pressure refrigerant and cool the air conditioning wind to be blown mainly to an area of the front seat side in the vehicle interior.

On the other hand, the second liquid-phase refrigerant outflow port 31e is connected to the refrigerant inlet side of the rear seat evaporator 14b. The rear seat evaporator 14b is a cooling heat exchanger for exchanging heat between the low-pressure refrigerant depressurized by the ejector 13 and the blast air blown from the rear seat blower fan 15b to the rear seat side in the vehicle interior to cool the air conditioning wind blown mainly to the area on the rear seat side in the vehicle interior.

The refrigerant outlet side of the front seat evaporator 14a is connected with the first refrigerant suction port 31b of the ejector 13, and the refrigerant outlet side of the rear seat evaporator 14b is connected with the second refrigerant suction port 31c of the ejector 13. In other words, in the ejector refrigeration cycle 10 of this embodiment, the front seat evaporator 14a and the rear seat evaporator 14b are connected in parallel to each other.

Each of the front seat blower fan 15a and the rear seat blower fan 15b is an electric blower the rotation speed (the amount of blast air) of which is controlled by a control voltage output from the control device. Further, the gas-phase refrigerant outflow port 31f of the ejector 13 is connected with the suction side of the compressor 11.

In the ejector refrigeration cycle 10 according to this embodiment, the compressor 11, the radiator 12, and the ejector 13 are arranged in a bonnet arranged in front of the vehicle interior, the front seat evaporator 14a is arranged on a front side of the vehicle interior, and the rear seat evaporator 14b is arranged on a rear side of the vehicle interior. In other words, the front seat evaporator 14a is arranged at a position closer to an ejector 13m than the rear seat evaporator 14b.

For that reason, the passage pressure loss in the refrigerant path extending from the first liquid-phase refrigerant outflow port 31d of the ejector 13 to the first refrigerant suction port 31b of the ejector 13 through the front seat evaporator 14a is larger than the passage pressure loss in the refrigerant path extending from the second liquid-phase refrigerant outflow port 31e of the ejector 13 to the second refrigerant suction port 31c of the ejector 13 through the rear seat evaporator 14b.

Under the circumstances, in this embodiment, as described above, the passage pressure loss of the liquid-phase refrigerant outflow passages 30i is set so that the passage pressure loss in the refrigerant path extending from the gas-liquid separation space 30f of the ejector 13 to the inflow space 30c of the ejector 13 through the front seat evaporator 14a becomes equal to the passage pressure loss in the refrigerant pressure extending from the gas-liquid separation space 30f of the ejector 13 to the inflow space 30c of the ejector 13 through the rear seat evaporator 14b.

Next, the control device (not shown) includes a well-known microcomputer including a CPU, a ROM and a RAM, and peripheral circuits of the microcomputer. The control device controls the operations of the above-mentioned various electric actuators 11b, 12d, 15a, and 15b by performing various calculations and processing on the basis of a control program stored on the ROM.

Further, the control device is connected with a sensor group for controlling air conditioning, such as an inside air temperature sensor for detecting the temperature in the vehicle interior, an outside air temperature sensor for detecting the temperature of outside air, a solar radiation sensor for detecting the quantity of solar radiation in the vehicle interior, front seat and rear seat evaporator-temperature sensors for detecting the blown our air temperatures (the temperatures of the evaporator) of the front seat evaporator 14a and the rear seat evaporator 14b, an outlet-side temperature sensor for detecting the temperature of a refrigerant on the outlet side of the heat radiator 12, and an outlet-side pressure sensor for detecting the pressure of the refrigerant on the outlet side of the heat radiator 12. Detection values of the sensor group are input to the control device.

Furthermore, an operation panel (not shown), which is disposed near a dashboard panel positioned at the front part in the vehicle interior, is connected to the input side of the control device, and operation signals output from various operation switches mounted on the operation panel are input to the control device. An air conditioning operation switch that is used to require air conditioning in the vehicle interior by the occupant, a vehicle interior temperature setting switch that is used to set the temperature in the vehicle interior by the occupant, and the like are provided as the various operation switches that are mounted on the operation panel.

Meanwhile, the control device of this embodiment is integrated with a control device that controls the operations of various control target devices connected to the output side of the control device, but structure (hardware and software), which controls the operations of the respective control target devices, of the control device forms control devices of the respective control target devices. For example, structure (hardware and software), which controls the operation of the electric motor 11b of the compressor 11, forms discharge capability control means in this embodiment.

Next, the operation of this embodiment having the above-mentioned configuration will be described with reference to a Mollier diagram of FIG. 6. The axis of ordinate in the Mollier diagram represents a pressure corresponding to P0, P1, and P2 in FIG. 4. First, when an operation switch of the operation panel is turned on, the control device operates the electric motor 11b of the compressor 11, the cooling fan 12d, and the respective blower fans 15a, 15b. Accordingly, the compressor 11 draws and compresses a refrigerant and discharges the refrigerant.

The gas-phase refrigerant (point a6 in FIG. 6), which is discharged from the compressor 11 and has a high temperature and a high pressure, flows into the condenser 12a of the heat radiator 12 and is condensed by exchanging heat between the blast air (outside air), which is blown from the cooling fan 12d, and itself and by radiating heat. The refrigerant, which has radiated heat in the condenser 12a, is separated into gas and liquid in the receiver part 12b. A liquid phase refrigerant, which has been subjected to gas-liquid separation in the receiver part 12b, is changed into a subcooled liquid phase refrigerant by exchanging heat between the air, which is blown from the cooling fan 12d, and itself in the subcooling part 12c and further radiating heat (from point a6 to point b6 in FIG. 6).

Figure 6:
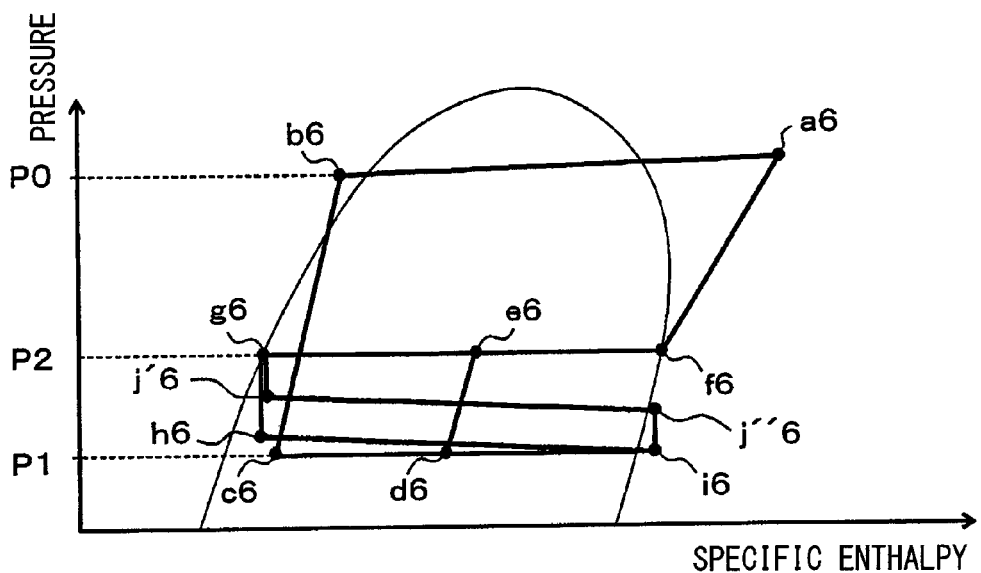
FIG. 6 is a Mollier diagram illustrating a state of the refrigerant in the ejector refrigeration cycle according to the first embodiment.

The subcooled liquid-phase refrigerant that has flowed out of the subcooling portion 12c of the heat radiator 12 is isoentropically depressurized by the nozzle passage 13a, and ejected (from point b6 to point c6 in FIG. 6). The nozzle passage 13a is defined between the inner peripheral surface of the depressurization space 30b of the ejector 13 and the outer peripheral surface of the passage formation member 35.

The refrigerant flowing out of the front seat evaporator 14a is drawn into the inflow space 30c through the first refrigerant suction port 31b by the action of drawing the ejection refrigerant jetted from the nozzle passage 13a, and the refrigerant flowing out of the rear seat evaporator 14b is drawn into the inflow space 30c through the second refrigerant suction port 31c. Further, the refrigerant flowing out of the front seat evaporator 14a and the refrigerant flowing out of the rear seat evaporator 14b are merged in the inflow space 30c (point i6 in FIG. 6).

In this situation, the refrigerant passage area in the minimum passage area part 30m of the depressurizing space 30b is regulated so that the degree of superheating of the merged refrigerant which has been merged in the inflow space 30c comes close to a predetermined value. In addition, the ejection refrigerant jetted from the nozzle passage 13a and the suction refrigerant drawn through the suction passage 13b flow into the diffuser passage 13c (from point c6 to point d6, and from point i6 to point d6 in FIG. 6).

In the diffuser passage 13c, the velocity energy of the refrigerant is converted into the pressure energy due to the enlarged refrigerant passage area. As a result, the mixed refrigerant is pressurized while the ejection refrigerant and the suction refrigerant are mixed together (from point d6 to point e6 in FIG. 6). The refrigerant that flowed out of the diffuser passage 13c is separated into gas and liquid in the gas-liquid separation space 30f (from point e6 to point f6, and from point e6 to point g6 in FIG. 6).

The refrigerant flowing out of the first liquid-phase refrigerant outflow port 31d in the liquid-phase refrigerant separated by the gas-liquid separation space 30f flows into the front seat evaporator 14a. In this situation, the refrigerant flowing out of the first liquid-phase refrigerant outflow port 31d is depressurized by the passage pressure loss in the liquid-phase refrigerant outflow passage 30i that connects the gas-liquid separation space 30f and the first liquid-phase refrigerant outflow port 31d (from point g6 to point h6 in FIG. 6).

The refrigerant flowing into the front seat evaporator 14a absorbs heat from the blast air blown by the front seat blower fan 15a, and evaporates (from point h6 to point i6 in FIG. 6). Accordingly, the blast air blown into the area on the front seat side is cooled. The refrigerant flowing out of the front seat evaporator 14a is drawn from the first refrigerant suction port 31b.

On the other hand, in the liquid-phase refrigerant that has been separated in the gas-liquid separation space 30f, the refrigerant flowing out of the second liquid-phase refrigerant outflow port 31e flows into the front seat evaporator 14a. In this situation, the refrigerant flowing out of the second liquid-phase refrigerant outflow port 31e is depressurized by the passage pressure loss of the refrigerant path extending from the second liquid-phase refrigerant outflow port 31e to the refrigerant inlet side of the rear seat evaporator 14b (from point g6 to point j'6 in FIG. 6).

The refrigerant flowing out to the rear seat evaporator 14*b* absorbs heat from blast air blown by the rear seat blower fan 15*b*, and evaporates (from point j'6 to point j"6 in FIG. 6). Accordingly, the blast air blown to the area on the rear seat side is cooled. The refrigerant flowing out of the rear seat evaporator 14*b* is further depressurized by the passage pressure loss of the refrigerant path extending the refrigerant outlet side of the rear seat evaporator 14*b* to the second refrigerant suction port 31*c* (from point j"6 to point i6 in FIG. 6), and drawn from the second refrigerant suction port 31*c*.

The gas-phase refrigerant that has been separated in the gas-liquid separation space 30*f* flows out of the gas-phase refrigerant outflow port 31*f* to be drawn into the compressor 11 and compressed again, and is again pressurized (from point f6 to point a6 in FIG. 6).

The ejector refrigeration cycle 10 according to this embodiment operates as described above, and can cool the blast air to be blown into the areas of the front and rear seat sides in the vehicle interior. Further, in the ejector refrigeration cycle 10, since the refrigerant pressurized by the diffuser passage 13*c* is drawn into the compressor 11, the drive power of the compressor 11 can be reduced to improve the cycle of performance (COP).

Further, according to the ejector 13 of this embodiment, the refrigerant swirls in the swirling space 30*a* with the results that a refrigerant pressure on a swirling center side in the swirling space 30*a* can be reduced to a pressure of a saturated liquid-phase refrigerant, or a pressure at which the refrigerant is depressurized and boiled (cavitation occurs). With the above operation, a larger amount of gas-phase refrigerant is present on an inner peripheral side than an outer peripheral side of a swirling center axis. This leads to a two-phase separation state in which the refrigerant has a gas single phase in the vicinity of a swirling center line within the swirling space 30*a*, and has a liquid single phase around the vicinity thereof.

The refrigerant that has become in the two-phase separation state as described above flows into the nozzle passage 13*a*. As a result, in the convergent part 131 of the nozzle passage 13*a*, boiling of the refrigerant is promoted by the wall surface boiling generated when the refrigerant is separated from the outer peripheral side wall surface of the annular refrigerant passage, and the interface boiling caused by a boiling nuclear generated by the cavitation of the refrigerant on the center axis side of the annular refrigerant passage. Accordingly, the refrigerant that flows into the minimum passage area part 30*m* of the nozzle passage 13*a* becomes in a gas-liquid mixed state in which the gas phase and the liquid phase are uniformly mixed together.

The flow of the refrigerant in the gas-liquid mixed state is blocked (choked) in the vicinity of the minimum passage area part 30*m*. The refrigerant in the gas-liquid mixed state which reaches the sonic speed by the choking is accelerated in the divergent part 132, and ejected. Accordingly, the refrigerant of the gas-liquid mixed state can be efficiently accelerated to the sonic speed by the boiling promotion caused by both of the wall surface boiling and the interface boiling. As a result, the energy conversion efficiency in the nozzle passage 13*a* can be improved.

Further, a cross-sectional shape of the diffuser passage 13*c* is formed in a conical shape with the employment of the passage formation member 35 having a cross-sectional area which increases with distance from the depressurizing space 30*b*. In the diffuser passage 13*c*, the refrigerant increased in speed with high energy conversion efficiency in the nozzle passage 13*a* is introduced directly into the gas-liquid separation space 30*f* while swirling around an axis of the passage formation member 35.

Therefore, as compared with a case in which the refrigerant flowing out of the ejector flows into the gas-liquid separation means configured separately from the ejector, a flow rate of the refrigerant flowing into the gas-liquid separation space 30*f* can be set to a high value. With the above configuration, a kinetic energy of the refrigerant flowing out of the diffuser passage 13*c* and flowing into the gas-liquid separation space 30*f* can be improved.

The refrigerant can flow out to the sides of the front seat evaporator 14*a* and the rear seat evaporator 14*b* from the gas-liquid separation space 30*f* through the liquid-phase refrigerant outflow passages 30*i* with the use of the kinetic energy. As a result, according to the ejector 13 of this embodiment, the refrigerant can be appropriately supplied to those evaporators 14*a* and 14*b* when being applied to the ejector refrigeration cycle having the multiple evaporators (specifically, the front seat evaporator 14*a* and the rear seat evaporator 14*b*) which are connected in parallel to each other.

In the ejector 13 according to this embodiment, the liquid-phase refrigerant outflow passages 30*i* that connect the gas-liquid separation space 30*f* and the first and second liquid-phase refrigerant outflow ports 31*d*, 31*e* are arranged symmetrically with respect to the axial center of the gas-liquid separation space 30*f* when viewed in the center axial direction of the gas-liquid separation space 30*f*. The inlet ports of the liquid-phase refrigerant outflow passages 30*i* which are open in the gas-liquid separation space 30*f* are arranged at an equal angular interval to each other with respect to the axial center of the gas-liquid separation space 30*f*.

According to the above configuration, since the states of the refrigerant on the inlet sides of the respective liquid-phase refrigerant outflow passages 30*i* can be equalized, and the refrigerant can be further appropriately supplied to the multiple evaporators 14*a* and 14*b* connected in parallel to each other.

In more detail, in the gas-liquid separation space 30*f* according to this embodiment, since the refrigerant is separated into gas and liquid by the action of a centrifugal force, as illustrated in FIG. 5, a layer (liquid film) of the separated liquid-phase refrigerant is generated on the outer peripheral side of the gas-liquid separation space 30*f*. In this situation, when the liquid-phase refrigerant outflow passages 30*i* are arranged as in this embodiment, even if the flow rate of refrigerant flowing in the cycle is varied according to a change in the operating conditions of the ejector refrigeration cycle 10, thicknesses of the liquid film of the refrigerant on the inlet sides of the respective liquid-phase refrigerant outflow passages 30*i* can be equalized.

Therefore, the states of the refrigerants flowing into the respective liquid-phase refrigerant outflow passages 30*i* are equalized, and the refrigerant can be appropriately supplied to the multiple evaporators 14*a* and 14*b* connected in parallel to each other. In other words, when the liquid-phase refrigerant outflow passages 30*i* are arranged as in this embodiment, even if the flow rate of refrigerant flowing through the cycle is varied, robustness for stably and appropriately supplying the refrigerant to the respective liquid-phase refrigerant outflow passages 30*i* can be improved.

Further, in the ejector 13 according to this embodiment, the multiple liquid-phase refrigerant outflow passages 30*i* extend in a tangential direction of the inner peripheral wall surface of the gas-liquid separation space 30*f*. Therefore, an energy loss when the refrigerant flows out to the liquid-phase refrigerant outflow passages 30i from the gas-liquid separation space 30f is suppressed, the kinetic energy of the refrigerant swirling in the gas-liquid separation space 30f is effectively utilized. As a result, the refrigerant can flow out to the multiple evaporators 14a and 14b side from the liquid-phase refrigerant outflow passages 30i.

As a result, according to the ejector 13 of this embodiment, the refrigerant can be appropriately supplied to the multiple evaporators 14a and 14b connected in parallel to each other.

In the ejector 13 according to this embodiment, the flow rate of the refrigerant flowing into the gas-liquid separation space 30f can increase to set the velocity component of the refrigerant flowing into the gas-liquid separation space 30f in the swirling direction to a high value. Therefore, the gas-liquid separation performance of the gas-liquid separation space 30f can be improved, and the capacity of the gas-liquid separation space 30f can be effectively reduced.

In the ejector 13 according to this embodiment, since the refrigerant flowing through the diffuser passage 13c can be swirled, a flow passage for pressurizing the refrigerant in the diffuser passage 13c can be defined in a spiral shape. Therefore, the dimension of the diffuser passage 13c in an axial direction (axial direction of the passage formation member 35) thereof can be restrained from increasing, and upsizing of the body as the overall ejector 13 can be suppressed.

In the ejector 13 according to this embodiment, since the driving device 37 is provided, the nozzle body 32 can be displaced in accordance with a load variation of the ejector refrigeration cycle 10 to regulate the refrigerant passage area (passage cross-sectional area in the minimum passage area part 30m) of the nozzle passage 13a. Therefore, the ejector 13 can appropriately operate according to the load variation of the ejector refrigeration cycle 10.

Further, since the driving device 37 is arranged at a position sandwiched between the suction passage 13b and the diffuser passage 13c vertically, a space defined between the suction passage 13b and the diffuser passage 13c can be effectively utilized. As a result, the body as the overall ejector can be further restricted from being upsized.

Moreover, since the sealed space 37b is arranged at the position surrounded by the suction passage 13b and the diffuser passage 13c, the temperature of the merged refrigerant merged in the inflow space 30c is excellently transmitted to the temperature sensitive medium without being affected by an outside air temperature, and the pressure in the sealed space 37b can be changed accordingly. That is, the pressure within the sealed space 37b can change with high precision according to the temperature of the merged refrigerant merged in the inflow space 30c, and the refrigerant passage area of the nozzle passage 13a can further appropriately change.

In the ejector 13 according to this embodiment, the multiple refrigerant suction ports (specifically, first and second refrigerant suction ports 31b, 31c) are provided. Further, when viewed in the center axial direction of the inflow space 30c, the suction refrigerant inflow passage 30h that connects the refrigerant suction port and the inflow space 30c extends in the tangential direction of the inner peripheral wall surface of the inflow space 30c, and the outlet portions of the multiple (two in this embodiment) suction refrigerant inflow passages 30h which are open in the inflow space 30c are arranged at an equal angular interval to each other with respect to the axial center of the inflow space 30c.

With the above configuration, the refrigerant in the inflow space 30c is swirled in the same direction as that of the refrigerant in the swirling space 30a, and the swirling flow of the refrigerant flowing into the diffuser passage 13c can be promoted. As a result, the kinetic energy of the refrigerant flowing out of the diffuser passage 13c and flowing into the gas-liquid separation space 30f can be further improved.

In the ejector 13 according to this embodiment, the passage pressure loss of the liquid-phase refrigerant outflow passage 30i connecting the gas-liquid separation space 30f and the first liquid-phase refrigerant outflow port 31d is set to be different in value from the passage pressure loss of the liquid-phase refrigerant outflow passage 30i connecting the gas-liquid separation space 30f and the second liquid-phase refrigerant outflow port 31d.

As a result, as in this embodiment, when the passage pressure loss in the refrigerant path extending from the gas-liquid separation space 30f of the ejector 13 to the inflow space 30c of the ejector 13 through the front seat evaporator 14a is set to be equal to the passage pressure loss in the refrigerant path extending from the gas-liquid separation space 30f of the ejector 13 to the inflow space 30c of the ejector 13 through the rear seat evaporator 14b, the refrigerant of the same flow rate can be supplied to the respective evaporators 14a and 14b.

Further, when the passage pressure loss in the refrigerant path extending from the gas-liquid separation space 30f of the ejector 13 to the inflow space 30c of the ejector 13 through the front seat evaporator 14a is set to be different in value from the passage pressure loss in the refrigerant path extending from the gas-liquid separation space 30f of the ejector 13 to the inflow space 30c of the ejector 13 through the rear seat evaporator 14b, the refrigerant evaporation temperatures in the respective evaporators 14a and 14b can be set to different temperatures.

(Second Embodiment)

Figure 7:
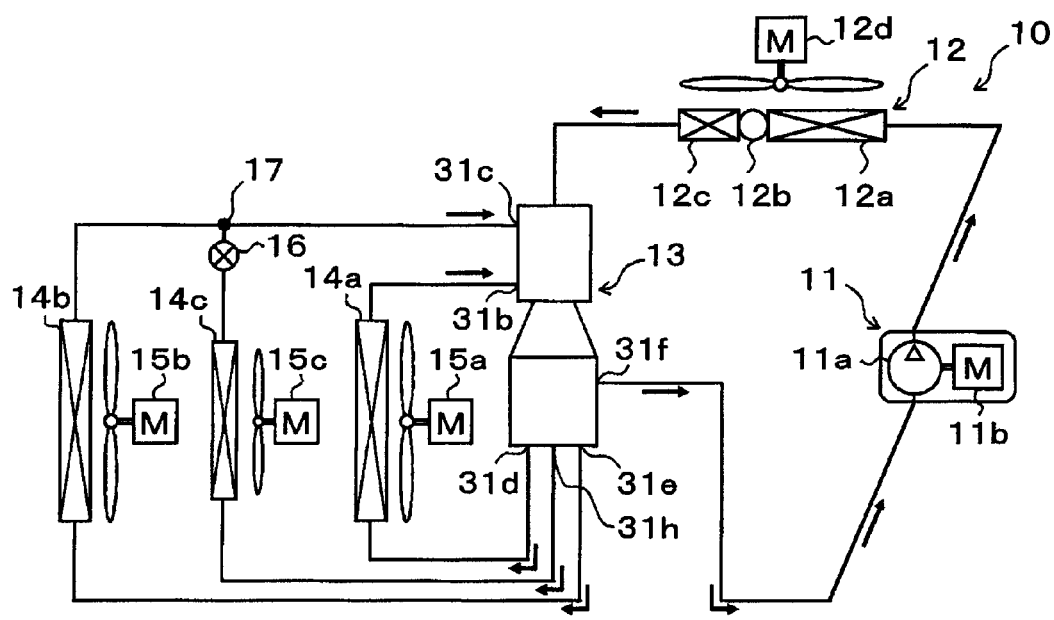
FIG. 7 is a schematic diagram of an ejector refrigeration cycle according to a second embodiment.

In this embodiment, as illustrated in an overall configuration diagram of FIG. 7, a description will be given of an ejector refrigeration cycle 10 in which a cool box evaporator 14c, a cool box blower fan 15c, an opening-and-closing valve 16, and a merging part 17 are added to the ejector refrigeration cycle of the first embodiment. Meanwhile, the same portions or equivalent portions as those in the first embodiment are denoted by the same symbols in FIG. 7. Further, in this embodiment, the respective configurations of the ejector 13 not illustrated in FIG. 7 are denoted by the same symbols as the first embodiment for description.

The cool box means a refrigerator installed in the vehicle interior. Therefore, the cool box evaporator 14c according to this embodiment performs a function of cooling an inner air in the cool box (refrigerator), which is circulated and blown by the cool box blower fan 15c. A basic configuration of the cool box blower fan 15c is the same as the front seat blower fan 15a and the rear seat blower fan 15b.

The ejector 13 according to this embodiment is provided with three liquid-phase refrigerant outflow passages 30i through which the liquid-phase refrigerant separated by the gas-liquid separation space 30f flows out. As the refrigerant outlet portions of the respective liquid-phase refrigerant outflow passages 30i, a third liquid-phase refrigerant outflow port 31h is disposed in addition to the first and second liquid-phase refrigerant outflow ports 31d and 31e of the first embodiment. The third liquid-phase refrigerant outflow port 31h is connected with a refrigerant inlet side of the cool box evaporator 14c.

Further, as in the first embodiment, the respective liquid-phase refrigerant outflow passages 30i according to this embodiment extend in the tangential direction of the inner peripheral wall surface of the gas-liquid separation space $30f$ of the ejector 13. Inlet portions of the multiple (three in this embodiment) liquid-phase refrigerant outflow passages $30i$ which are open in the gas-liquid separation space $30f$ are arranged at equal angular intervals (120° intervals in this embodiment) to each other with respect to the axial center of the gas-liquid separation space $30f$.

In the ejector refrigeration cycle 10 according to this embodiment, the refrigerant outlet side of the rear seat evaporator $14b$ and the refrigerant outlet side of the cool box evaporator $14c$ are connected with the merging part 17 of a three-way joint structure. Further, the refrigerant outlet port of the merging part 17 is connected with the second refrigerant suction port $31c$ of the ejector 13. Therefore, the merging part 17 performs a function of merging a flow of the refrigerant flowing out of the rear seat evaporator $14b$ and a flow of the refrigerant flowing out of the cool box evaporator $14c$, and guiding the merged refrigerant into the second refrigerant suction port $31c$.

Further, the opening-and-closing valve 16 that opens and closes the refrigerant passage that connects the refrigerant outlet side of the cool box evaporator $14c$ and the merging part 17 is arranged between the refrigerant outlet side of the cool box evaporator $14c$ and the merging part 17. The opening-and-closing valve 16 is an electromagnetic valve whose opening-and-closing operation is controlled by a control voltage output from the control device.

As is apparent from the above description, in the ejector refrigeration cycle 10 according to this embodiment, a cycle configuration in which when the control device opens the opening-and-closing valve 16, the front seat evaporator $14a$, the rear seat evaporator $14b$, and the cool box evaporator $14c$ are connected in parallel to each other is provided.

Further, in the ejector refrigeration cycle 10 according to this embodiment, the passage pressure losses of the liquid-phase refrigerant outflow passages $30i$ and other refrigerant piping are set so that when the control device opens the opening-and-closing valve 16, the passage pressure loss in the refrigerant path extending from the second liquid-phase refrigerant outflow port $31e$ to the merging part 17 through the rear seat evaporator $14b$ becomes equal to the passage pressure loss in the refrigerant path extending from the third liquid-phase refrigerant outflow port $31h$ to the merging part 17 through the cool box evaporator $14c$ and the opening-and-closing valve 16.

The ejector 13 according to this embodiment is provided with three liquid-phase refrigerant outflow ports, and two refrigerant suction ports. In other words, the number of liquid-phase refrigerant outflow passages $30i$ is different from the number of refrigerant suction ports. Further, an operation panel of this embodiment is provided with a cool box operation switch for requiring the operation of the cool box. The other configurations of the ejector 13 and the ejector refrigeration cycle 10 are identical with those in the first embodiment.

Subsequently, the operation of this embodiment having the above configuration will be described. First, when the cool box operating switch is kept off in a state where the air conditioning operating switch turns on, and, a mode is changed to a dedicated air conditioning mode in which the cool box is not operated. In the dedicated air conditioning mode, the control device closes the opening-and-closing valve 16, and stops the operation of the cool box blower fan $15c$.

Therefore, in the dedicated air conditioning mode, as in the first embodiment, a cycle in which the front seat evaporator $14a$ and the rear seat evaporator $14b$ are connected in parallel to each other is configured. Hence, substantially the same advantages as those in the first embodiment can be obtained.

On the other hand, when the cool box operating switch turns on in a state where the air conditioning operating switch is kept on, the mode becomes an air conditioning and refrigeration shared mode in which the cool box is operated. In the air conditioning and refrigeration shared mode, the control device opens the opening-and-closing valve 16, and operates the cool box blower fan $15c$.

With the above configuration, in the air conditioning and refrigeration shared mode, a cycle in which the front seat evaporator $14a$, the rear seat evaporator $14b$, and the cool box evaporator $14c$ are connected in parallel to each other is configured. The refrigerant flowing out of the third liquid-phase refrigerant outflow port $31h$ of the ejector 13 flows into the cool box evaporator $14c$.

The refrigerant flowing into the cool box evaporator $14c$ absorbs heat from the inner air circulated and blown by the cool box blower fan $15c$, and evaporates. As a result, the inner air is cooled. Further, the refrigerant flowing out of the cool box evaporator $14c$ flows into the merging part 17 through the opening-and-closing valve 16, merges with the refrigerant flowing out of the rear seat evaporator $14b$, and is drawn from the second refrigerant suction port $31c$ of the ejector 13. The other operation is identical with that in the dedicated air conditioning mode.

Therefore, even in the air conditioning and refrigeration shared mode, the refrigerant can be appropriately supplied to the multiple evaporators connected in parallel to each other with the effective utilization of the kinetic energy of the refrigerant swirling in the gas-liquid separation space $30f$ of the ejector 13. As a result, the same advantages as those in the first embodiment can be obtained.

In this example, a volume of the refrigeration interior which is a space to be cooled in the cool box evaporator $14c$ is extremely small as compared with the volume of the vehicle interior which is a space to be cooled in the front seat evaporator $14a$ or the rear seat evaporator $14b$. For that reason, the refrigerant flow rate to be supplied to the cool box evaporator $14c$ in the air conditioning and refrigeration shared mode is small as compared with the flow rate of refrigerant to be supplied to the front seat evaporator $14a$ or the rear seat evaporator $14b$.

Therefore, a different in flow rate between the flow rate of the refrigerant drawn from the second refrigerant suction port $31c$ in the dedicated air conditioning mode and the flow rate of refrigerant drawn from the second refrigerant suction port $31c$ in the air conditioning and refrigeration shared mode is extremely small. Under the circumstances, the ejector 13 according to this embodiment employs a configuration having three liquid-phase refrigerant outflow ports and two refrigerant suction ports.

With the above configuration, the swirling flow of the refrigerant in the inflow space $30c$ of the ejector 13 in the dedicated air conditioning mode and the swirling flow of the refrigerant in the inflow space $30c$ in the air conditioning and refrigeration shared mode are restrained from changing, and the swirling flow of the refrigerant flowing into the diffuser passage $13c$ from the inflow space $30c$ can be stably promoted.

Further, in this embodiment, the opening-and-closing valve 16 is arranged on an upstream side of the merging part 17, and the opening-and-closing valve 16 is opened and closed to switch mode between the dedicated air conditioning mode and the air conditioning and refrigeration shared mode. Therefore, the dedicated air conditioning mode and the air conditioning and refrigeration shared mode can be extremely easily switched.

Incidentally, in this embodiment, an example in which in order to promote the swirling flow in the inflow space 30c of the ejector 13, the three liquid-phase refrigerant outflow passages and the two refrigerant suction ports are provided have been described. However, the number of liquid-phase refrigerant outflow passages and the number of refrigerant suction ports are not limited to those numbers.

For example, as in the first embodiment, two liquid-phase refrigerant outflow passages and three refrigerant suction ports may be provided. In this situation, it is desirable that when viewed in the center axial direction of the inflow space 30c, the suction refrigerant inflow passage 30h that connects the respective refrigerant suction ports and the inflow space 30c extends in the tangential direction of the inner peripheral wall surface of the inflow space 30c, and the outlet portions of the three suction refrigerant inflow passages 30h which are open in the inflow space 30c are arranged at equal angular intervals (specifically, 120° intervals) to each other with respect to the axial center of the inflow space 30c.

Further, a configuration may be applied in which a branch part that branches the flow of refrigerant is connected to the second liquid-phase refrigerant outflow port 31e, one of the refrigerants branched by the branch part flows into the rear seat evaporator 14b, and the other refrigerant branched by the branch part flows into the cool box evaporator 14c through an opening-and-closing valve, and the refrigerants flowing out of the front seat evaporator 14a, the rear seat evaporator 14b, and the cool box evaporator 14c are drawn into the respective three refrigerant suction ports.

With the above configuration, the swirling flow of the refrigerant in the gas-liquid separation space 30f of the ejector 13 in the dedicated air conditioning mode and the swirling flow of the refrigerant in the gas-liquid separation space 30f in the air conditioning and refrigeration shared mode are restrained from changing, and the gas-liquid separation performance in the gas-liquid separation space 30f can be stabilized.

(Third Embodiment)

Figure 8A:
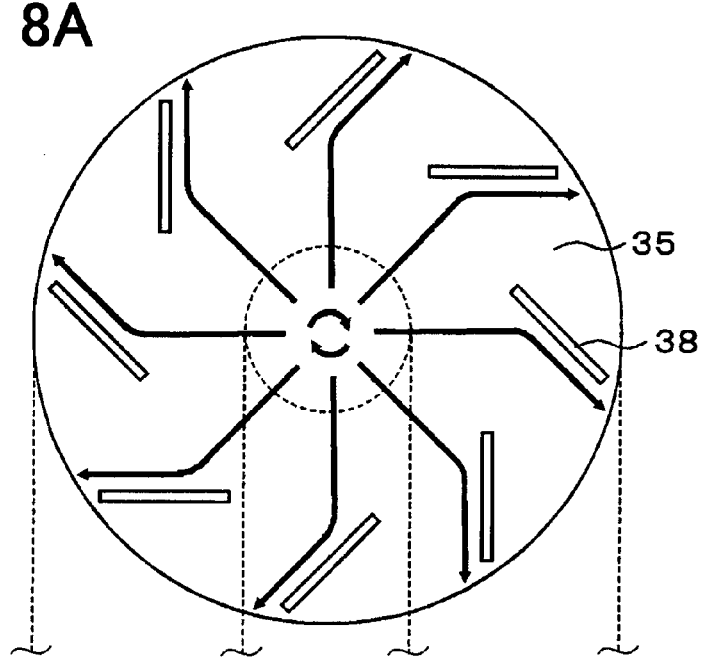
FIG. 8A is a schematic top view illustrating a passage formation member of an ejector according to a third embodiment of the present disclosure.
Figure 8B:
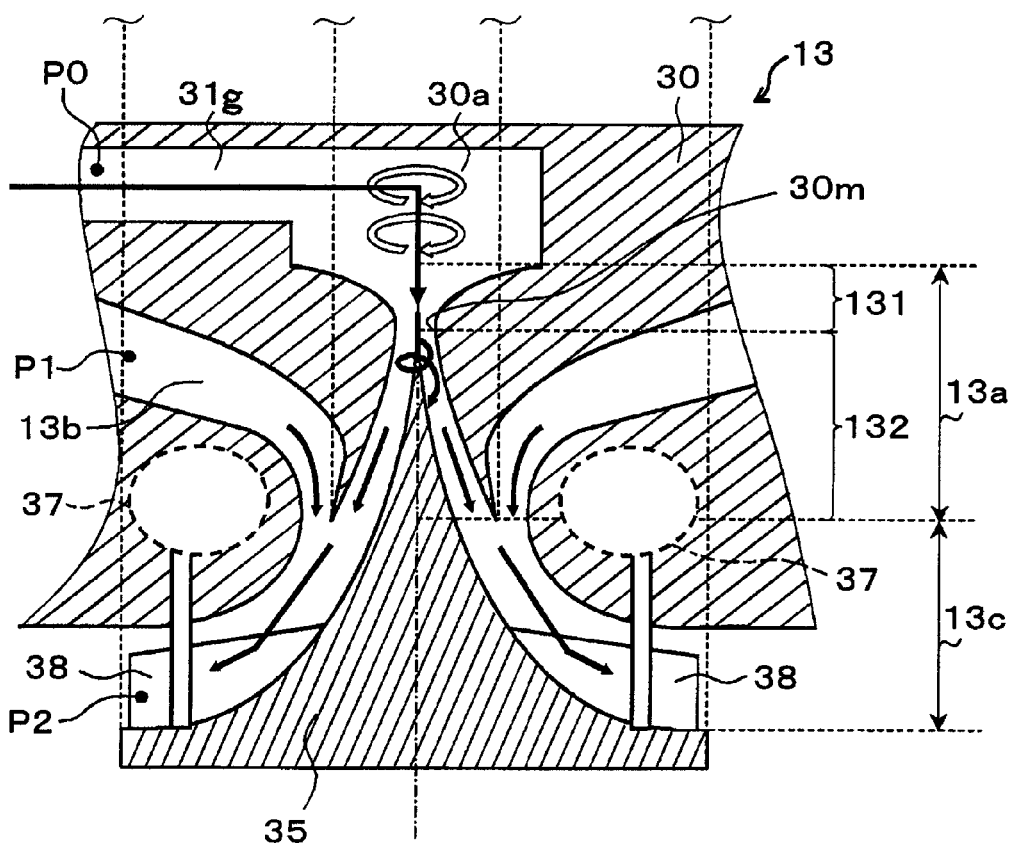
FIG. 8B is a schematic sectional view illustrating the ejector according to the third embodiment.

In this embodiment, a description will be given of an example in which, as illustrated in FIGS. 8A and 8B, multiple flow regulation plates 38 exemplifying the swirling promotion port for promoting the swirling of the refrigerant flowing out of the diffuser passage 13c around an axis of the passage formation member 35 are added to the ejector 13 of the first embodiment. In FIG. 8A, when viewing the passage formation member 35 from the axial direction, a flowing direction of the refrigerant flowing along a conical side of the passage formation member 35 is schematically illustrated by thick solid arrows, and the flow regulation plates 38 are also schematically illustrated.

In more detail, the flow regulation plates 38 are arranged on portions forming the outer peripheral side of a lowermost portion of the passage formation member 35 and the refrigerant outlet side of the diffuser passage 13c. Further, the flow regulation plates 38 are formed of plate members spread in the axial direction of the passage formation member 35. As illustrated in FIG. 8A, the flow regulation plates 38 are annularly arranged around the axis of the passage formation member 35.

The respective flow regulation plates 38 are arranged so that plate surfaces thereof are inclined with respect to a radial direction when viewed in the axial direction. Therefore, the refrigerant flowing out of the diffuser passage 13c flows along the plate surfaces of the respective flow regulation plates 38 to promote the flow of the refrigerant flowing out of the diffuser passage 13c in the swirling direction. Other structures and operations are the same as those of the first embodiment. Accordingly, the same advantages as those in the first embodiment can be obtained even in the ejector 13 of this embodiment.

For example, in an operating condition where the refrigerant flow rate flowing in the cycle is reduced with the reduction of a heat load of the ejector refrigeration cycle 10, a velocity component in the swirling direction may be extremely reduced as compared with the velocity component in the axial direction, or the velocity component in the swirling direction may be almost eliminated, in the velocity components of the refrigerant flowing in the diffuser passage 13c.

On the contrary, according to the ejector 13 of this embodiment, since the flow regulation plates 38 that is the swirling promotion portion are provided, the refrigerant flowing into the gas-liquid separation space 30f can swirl around the axis of the passage formation member 35 regardless of the operating conditions of the ejector refrigeration cycle 10 as indicated by the thick solid arrows in FIGS. 8A and 8B. Therefore, the centrifugal force can be surely exerted on the refrigerant in the gas-liquid separation space 30f.

As a result, according to the ejector 13 of this embodiment, the gas-liquid separation performance in the gas-liquid separation space 30f can be improved regardless of the operating condition of the ejector refrigeration cycle 10. Also, the refrigerant can be appropriately supplied to the front seat evaporator 14a and the rear seat evaporator 14b with the use of the kinetic energy of the refrigerant swirling in the gas-liquid separation space 30f.

In this embodiment, the flow regulation plates 38 each formed into the plate shape are described. However, the flow regulation plates 38 are not limited to this configuration. If the flowing of the refrigerant while swirling around the axis of the passage formation member 35 can be promoted, the flow regulation plates 38 may have a shape curved along the swirling flowing direction when viewed in the axial direction.

In this embodiment, as illustrated in FIG. 8A, multiple flow regulation plates 38 are arranged in a so-called decelerating cascade arrangement in which an interval between the respective flow regulation plates 38 on the refrigerant flow outlet side is wider than an interval between the respective flow regulation plates 38 on the inlet side. According to the above configuration, the flow regulation plates 38 can function as a diffuser that gradually enlarges the passage cross-sectional area of the refrigerant passage defined between the respective adjacent flow regulation plates 38 to convert a velocity energy of the refrigerant into a pressure energy.

Further, the arrangement of the flow regulation plates 38 are not limited to the above arrangement, but may be arranged in a so-called speed increasing cascade arrangement (accelerating cascade arrangement) in which the interval between the respective flow regulation plates 38 on the refrigerant flow outlet side is narrower than the interval between the respective flow regulation plates 38 on the refrigerant flow inlet side. According to this configuration, since the passage cross-sectional area of the refrigerant passage defined between the respective adjacent flow regulation plates 38 can be gradually reduced to increase the flow rate in the swirling direction of the refrigerant, the swirling flow can be effectively promoted.

The present disclosure is not limited to the above-mentioned embodiments, and may have various modifications as described below without departing from the gist of the present disclosure.

(1) In the above embodiments, the example in which the ejector 13 is applied to the ejector refrigeration cycle including the multiple evaporators that are connected in parallel to each other has been described, but the ejector refrigeration cycle 10 to which the ejector 13 is applicable is not limited to this configuration. For example, an ejector refrigeration cycle having four or more evaporators, or an ejector refrigerant cycle having one evaporator may be applied.

Further, when the ejector 13 is applied to the ejector refrigeration cycle having one evaporator, a cycle configuration in which the flows of the refrigerants flowing out of the multiple liquid-phase refrigerant outflow passages 30$i$ are merged, and the merged refrigerant flows into one evaporator may be employed. In the cycle configuration, the flow of the refrigerant flowing out of one evaporator is diverged, and drawn from multiple refrigerant suction ports.

A cycle configuration in which the opening-and-closing valve similar to that in the second embodiment may be arranged in the refrigerant path extending from the refrigerant outlet port of the rear seat evaporator 14$b$ to the second refrigerant suction port 31$c$ in the ejector refrigeration cycle 10 of the first embodiment may be provided. According to the above configuration, the blast air blown to the front seat side can be cooled by closing the opening-and-closing valve through the control device without cooling the blast air to be blown to the rear seat side.

In general, as compared with air conditioning on the front seat side in which a driver's seat is present, the necessity to perform air conditioning on the rear seat side is lower than that on the front seat side because an occupant may be absent on the rear seat side. Therefore, that the blast air to be blown to the front seat side can be cooled without cooling the blast air to be blown to the rear seat side is effective in the suppression of the energy consumption caused by performing unnecessary air conditioning on the rear seat side.

It is needless to say that a cycle configuration in which the opening-and-closing valves may be arranged in both of the refrigerant paths in the ejector refrigeration cycle 10 of the first embodiment may be provided. One of the refrigerant paths extends from the refrigerant outlet port of the front seat evaporator 14$a$ to the first refrigerant suction port 31$b$, and the other refrigerant path extends from the refrigerant outlet port of the rear seat evaporator 14$b$ to the second refrigerant suction portion 31$c$.

(2) In the above embodiments, the description has been given of the example in which the driving device 37 that displaces the passage formation member 35 includes the sealed space 37$b$ in which the temperature sensitive medium having the pressure changed according to a change in the temperature is sealed, and the diaphragm 37$a$ that is displaced according to the pressure of the temperature sensitive medium within the sealed space 37$b$. However, the driving device is not limited to this configuration.

For example, a thermowax having a volume changed according to the temperature may be employed as the temperature sensitive medium, or a configuration having an elastic member of a shape memory alloy may be used as the driving device. Further, a configuration in which the passage formation member 35 may be displaced by an electric mechanism such as an electric motor or a solenoid may be employed as the driving device.

(3) In the above-mentioned embodiments, although a material of the passage formation member 35 is not described, the passage formation member 35 may be made of metal (for example, aluminum) or resin. For example, when the passage formation member 35 is made of resin, and reduced in weight, the driving device 37 can be downsized, and the body of the overall ejector 13 can be further downsized.

(4) In the above embodiments, an example in which the ejector refrigeration cycle 10 including the ejector 13 is applied to a vehicle air conditioning apparatus has been described, but the application of the ejector refrigeration cycle 10 having the ejector 13 is not limited thereto. For example, the ejector refrigeration cycle 10 may be applied to, for example, a stationary air conditioning apparatus, cold storage warehouse, a cooling heating device for vending machine, etc.

(5) Examples in which a subcooling heat exchanger is employed as the heat radiator 12 have been described in the above-mentioned embodiments, but, needless to say, a normal heat radiator formed of only the condenser 12$a$ may be employed as the heat radiator 12.

What is claimed is:

1. An ejector for a vapor compression refrigeration cycle device having an evaporator that evaporates a refrigerant, the ejector comprising:

a body including a refrigerant inlet port, a swirling space in which a refrigerant flowing from the refrigerant inlet port is swirled, a depressurizing space in which the refrigerant flowing out of the swirling space is depressurized, a suction passage that communicates with a downstream side of the depressurizing space in a refrigerant flow and draws the refrigerant from an external, and a pressurizing space in which an ejection refrigerant jetted from the depressurizing space is mixed with a suction refrigerant drawn from the suction passage; and a passage formation member which is at least partially arranged inside the depressurizing space and inside the pressurizing space and has a conical shape having a cross-sectional area that increases with distance from the depressurizing space, wherein a refrigerant passage provided between an inner peripheral surface of a portion of the body, which defines the depressurizing space, and an outer peripheral surface of the passage formation member is a nozzle passage functioning as a nozzle that depressurizes and jets the refrigerant flowing out of the swirling space, a refrigerant passage provided between an inner peripheral surface of a portion of the body, which defines the pressurizing space, and an outer peripheral surface of the passage formation member is a diffuser passage functioning as a diffuser that mixes the ejection refrigerant and the suction refrigerant together and pressurizes the mixed refrigerant, the diffuser passage has an annular shape in a cross-section surface perpendicular to an axial direction of the passage formation member, and the body further includes a gas-liquid separation space that separates the refrigerant flowing out of the pressurizing space into gas and liquid by the action of a centrifugal force, and a plurality of liquid-phase refrigerant outflow passages through which the liquid-phase refrigerant separated by the gas-liquid separation space flows out to the evaporator.

2. The ejector according to claim 1, wherein
the gas-liquid separation space has a shape of a solid of revolution and is arranged coaxially with the passage formation member, and the plurality of liquid-phase refrigerant outflow passages are arranged symmetrically with respect to an axial center of the gas-liquid separation space in a cross-section surface perpendicular to the axial direction of the gas-liquid separation space.

3. The ejector according to claim 1, wherein
the gas-liquid separation space has a shape of a solid of revolution and is arranged coaxially with the passage formation member, and
a flowing direction of the refrigerant from the gas-liquid separation space to the liquid-phase refrigerant outflow passages is a tangential direction of the inner peripheral wall surface of the gas-liquid separation space.

4. The ejector according to claim 2, wherein inlet portions of the plurality of liquid-phase refrigerant outflow passages, which are open in the gas-liquid separation space, are arranged at equal angular intervals with respect to the axial center of the gas-liquid separation space in a cross-section surface perpendicular to the axial direction of the gas-liquid separation space.

5. The ejector according to claim 1, wherein the body further includes a plurality of refrigerant suction ports through which refrigerants flow into the suction passage from the external.

6. The ejector according to claim 5, wherein the number of liquid-phase refrigerant outflow passages and the number of refrigerant suction ports are different from each other.

7. The ejector according to claim 1, wherein a pressure loss in at least one of the plurality of liquid-phase refrigerant outflow passages is different from a pressure loss in another of the plurality of liquid-phase refrigerant outflow passages.

8. The ejector according to claim 1, further comprising a swirling promotion portion that promotes the swirling of the refrigerant flowing out of the diffuser passage around an axis of the passage formation member.

9. The ejector according to claim 1, wherein the refrigerant flowing in the diffuser passage swirls around an axis of the passage formation member.

* * * * *